United States Patent
Bruchner

(10) Patent No.: US 8,849,226 B2
(45) Date of Patent: Sep. 30, 2014

(54) WIRELESS RECEIVER

(75) Inventor: Wolfgang Bruchner, Southampton (GB)

(73) Assignee: Cascoda Limited, Eastleigh, Hampshire (GB)

( * ) Notice: Subject to any disclaimer, the term of this patent is extended or adjusted under 35 U.S.C. 154(b) by 1054 days.

(21) Appl. No.: 12/854,210

(22) Filed: Aug. 11, 2010

(65) Prior Publication Data

US 2011/0039509 A1    Feb. 17, 2011

Related U.S. Application Data

(60) Provisional application No. 61/233,516, filed on Aug. 13, 2009.

(51) Int. Cl.
| | | |
|---|---|---|
| *H04B 1/18* | (2006.01) | |
| *H04J 1/16* | (2006.01) | |
| *H04L 7/00* | (2006.01) | |
| *H04B 1/40* | (2006.01) | |

(52) U.S. Cl.
CPC ........................................ H04B 1/40 (2013.01)
USPC ...................... 455/190.1; 455/192.1; 455/205; 455/207; 370/252; 375/365

(58) Field of Classification Search
USPC ........ 455/232.1, 130, 132–136, 161.2, 161.3, 455/184.1, 226.1, 226.2, 226.3, 277.2, 455/295–296, 207, 131, 142, 157.1, 283, 455/278.1, 139, 190.1, 192.1, 205, 210; 370/204, 207, 208, 252; 375/365, 350, 375/355, 344, 320, 233, 252
See application file for complete search history.

(56) References Cited

U.S. PATENT DOCUMENTS

| | | | | |
|---|---|---|---|---|
| 5,001,776 A | * | 3/1991 | Clark | ........................ 455/226.2 |
| 5,758,271 A | | 5/1998 | Rich et al. | |

(Continued)

FOREIGN PATENT DOCUMENTS

| | | |
|---|---|---|
| EP | 0 366 485 | 5/1990 |
| EP | 0 488 739 | 6/1992 |

(Continued)

OTHER PUBLICATIONS

"CMOS RFIC Architectures for IEEE802.15.4 Networks", John Notor, Anthony Caviglia, and Gary Levy, Cadence Design Systems Inc. IEEE, 2003 (specification at p. 35, copy to be provided).

(Continued)

*Primary Examiner* — Pablo Tran
(74) *Attorney, Agent, or Firm* — Renner, Otto, Boisselle & Sklar, LLP

(57) ABSTRACT

A wireless receiver designed to conform to the standard IEEE 802.15.4. The receiver comprises an analog front-end and a digital decoder. The analog components of the front end include one or more amplifiers and an analog-to-digital converter (ADC). The digital decoder receives the output of the ADC and demodulates it in a demodulator which is driven at an a chip frequency by an internal or external clock. The demodulator comprises a sampler operable to sample the digital signal at a sampling frequency and a correlation unit operable to process a set of bits, referred to as a chip code, in the sampled digitized signal and output therefrom a set of correlation values. The set of correlation values is an indicator of likely mapping between the chip code that has been processed and a set of possible chip codes defined according to the standard. The demodulator further comprises a symbol selection unit and a frequency correction unit. The symbol selection unit has the function of deciding which symbol has been received based on an analysis of each set of correlation values. The frequency correction unit is operable to make adjustments to the chip frequency based on the correlation values output from the correlation unit, specifically to increase or decrease the chip frequency based on a measurement of whether the maximum correlation value among each set of correlation values occurs earlier or later than predicted. This scheme has the advantage that phase and frequency compensation is done after correlation avoiding the need for coherent demodulation while at the same time not requiring the stringent specifications of a conventional non-coherent demodulation scheme.

14 Claims, 12 Drawing Sheets

(56) References Cited

U.S. PATENT DOCUMENTS

| | | | |
|---|---|---|---|
| 6,058,150 A * | 5/2000 | Ghosh | 375/365 |
| 6,560,298 B1 * | 5/2003 | Froehling et al. | 375/344 |
| 7,349,464 B2 * | 3/2008 | Kimura | 375/152 |
| 7,733,983 B2 * | 6/2010 | Kroeger et al. | 375/320 |
| 7,839,923 B2 * | 11/2010 | Wang et al. | 375/233 |
| 8,306,171 B2 * | 11/2012 | Zinser | 375/355 |
| 2004/0190663 A1 | 9/2004 | Carsello et al. | |
| 2005/0069025 A1 | 3/2005 | Kimura | |
| 2005/0185743 A1 * | 8/2005 | Li | 375/350 |
| 2007/0223626 A1 | 9/2007 | Waxman | |
| 2008/0160945 A1 | 7/2008 | Crinon | |
| 2008/0165834 A1 | 7/2008 | Poegel et al. | |
| 2009/0168849 A1 | 7/2009 | Rouxel | |
| 2011/0051612 A1 * | 3/2011 | Van Driest et al. | 370/252 |

FOREIGN PATENT DOCUMENTS

| | | |
|---|---|---|
| EP | 0 876 000 | 11/1998 |
| JP | 2004-015539 | 1/2004 |
| WO | 2009/093892 | 7/2009 |

OTHER PUBLICATIONS

Designing a ZigBee-ready IEEE 802.15.4-compliant radio transceiver, Khanh Tuan Le, Chipcon, RF Design, Nov. 2004 (specification at p. 35, copy to be provided).

"An Ultra Low Power 130nm CMOS Direct Conversion Transceiver for IEEE802.15.4", C. Bernier, F. Hameau, G. Billiot, E. de Foucauld, S. Robinet, J. Durupt, F. Dehmas, E. Mercier, P.Vincent, L. Ouvry, D. Lattard, M. Gary, C. Bour, J. Prouvee, and S. Dumas, IEEE 2008 Radio Frequency Integrated Circuit (RFIC) Symposium, Jun. 15-17, 2008 (specification at p. 35, copy to be provided).

"Evaluation of SDR-implementation of IEEE 802.15.4 Physical Layer", Roger Martinsen Koteng, Master of Science in Electronics-Thesis, Jul. 2006 (specification at p. 35, copy to be provided).

"A Low-Complexity Frequency Offset Insensitive Detection for 2.4 GHz LR-WPAN", Jung-Su Han and Hyung-Jin Choi, IEICE Transactions on Communications, vol. E91-B, No. 7, Jul. 2008 (specification at p. 35, copy to be provided).

Daesik Park, Chester Sungchung Park and Kwyro Lee, Simple design of detector in the presence of frequency offset for IEEE 802.15.4 LR-WPANs, IEEE Transactions on Circuits and Systems II: Express Briefs, vol. 56, Issue 4, pp. 330-334, Apr. 2009 (copy to be provided).

"CMOS RFIC Architectures for IEEE802.15.4 Networks", John Notor, Anthony Caviglia, and Gary Levy, Cadence Design Systems Inc. IEEE, 2003 (specification at p. 35, cited in IDS filed Aug. 11, 2010, copy now provided).

Designing a ZigBee-ready IEEE 802.15.4-compliant radio transceiver, Khanh Tuan Le, Chipcon, RF Design, Nov. 2004 (specification at p. 35, cited in IDS filed Aug. 11, 2010, copy now provided).

"An Ultra Low Power 130nm CMOS Direct Conversion Transceiver for IEEE802.15.4", C. Bernier, F. Hameau, G. Billiot, E. de Foucauld, S. Robinet, J. Durupt, F. Dehmas, E. Mercier, P.Vincent, L. Ouvry, D. Lattard, M. Gary, C. Bour, J. Prouvee, and S. Dumas, IEEE 2008 Radio Frequency Integrated Circuit (RFIC) Symposium, Jun. 15-17, 2008 (specification at p. 35, cited in IDS filed Aug. 11, 2010, copy now provided).

"Evaluation of SDR-implementation of IEEE 802.15.4 Physical Layer", Roger Martinsen Koteng, Master of Science in Electronics-Thesis, Jul. 2006 (specification at p. 35, cited in IDS filed Aug. 11, 2010, copy now provided).

"A Low-Complexity Frequency Offset Insensitive Detection for 2.4 GHz LR-WPAN", Jung-Su Han and Hyung-Jin Choi, IEICE Transactions on Communications, vol. E91-B, No. 7, Jul. 2008 (specification at p. 35, cited in IDS filed Aug. 11, 2010, copy now provided).

Daesik Park, Chester Sungchung Park and Kwyro Lee, Simple design of detector in the presence of frequency offset for IEEE 802.15.4 LR-WPANs, IEEE Transactions on Circuits and Systems II: Express Briefs, vol. 56, Issue 4, pp. 330-334, Apr. 2009 (cited in IDS filed Aug. 11, 2010, copy now provided).

International Search Report for corresponding application No. PCT/GB2010/001533 dated Mar. 14, 2011.

Hyokjae Choi et al., "An experimental coin-sized radio for extremely low-power wpan" (IEEE 80.15.4), Dec. 1, 2003, pp. 2258-2268.

Oh N-J et al; "A CMOS 868/915 Direct Conversion Zigbee Single-Chip Radio", Dec. 1, 2005, pp. 100-109.

International Search Report for corresponding application No. PCT/GB2010/001533 dated Feb. 2, 2011.

"A Low Power Zigbee Baseband Processor" Kai-Hsin Chen and His-Pin Ma, Member, IEEE, 2008 International SoC Design Conference, Pisacataway, NJ, USA, Nov. 24, 2008, pp. 1-40-1-43, XP000940227 (cited in International Search Report filed Feb. 2, 2011, copy now provided).

"Timing Synchronization Using the Reliability Check and Smoothing Algorithm in the Fading Channels" Hyoung Kyu song, IEICE Transactions on Communications, Communications Society, Tokyo, JP, vol. E82-B No. 4, Apr. 1999 (cited in International Search Report filed Feb. 2, 2011, copy now provided).

"A Low-Complexity Frequency Offset Insensitive Detection for 2.45 GHz LR-WPAN" Han J-S et al., IEICE Transaction on Communications, Communications Society, Tokyo, JP, vol. E91B, No. 7, Jul. 1, 2008, pp. 2205-2213, XP001519867 (cited in International Search Report filed Feb. 2, 2011, copy now provided).

* cited by examiner

WIRELESS RECEIVER

This application claims the benefit of the filing date of U.S. Provisional Application No. 61/233,516 filed Aug. 13, 2009, which is incorporated herein by reference.

BACKGROUND OF THE INVENTION

The present invention relates to a wireless receiver, in particular as part of a wireless transceiver.

There is an increasing need for energy efficient homes, offices and industrial plants. Energy efficiencies can be achieved through the deployment of wireless sensor network (WSN) systems, which allow for building automation, industrial monitoring and many other applications. To address this market, the 2.4 GHz IEEE 802.15.4 worldwide wireless standard has been defined, which specifies a short-range low-power wireless protocol. To conform to the standard, electronic devices will need to be developed which integrate radio-frequency (RF) electronic components, micro-controllers, on-chip sensors and sensor interfaces. For commercial reasons, this integration will need to be done on a single integrated circuit, i.e. on a single chip.

A wireless or radio transceiver conforming to IEEE 802.15.4 should utilize its transmitted power resource to maintain a satisfactory signal power at an associated transceiver. The efficiency of the transceiver is known as power efficiency. The magnitude of signal power required at the receiver is determined by the sensitivity of the receiver. Receiver sensitivity is defined as the minimum signal power at the antenna that results in an error performance defined by the standard. Since receiver sensitivity is proportional to $n_f$, the noise factor of the receiver, and $SNR_{min}$, the minimum baseband signal-to-noise ratio at the demodulator, keeping either value to a minimum will result in greater power efficiency. The minimum signal power $P_{min}$ is specified by:

$$P_{min} = kT * BW * n_f * SNR_{min}$$

where:

kT=−174 dBm @ 25° C.;
BW=communication bandwidth (equivalent to chip rate for 802.15.4)=2 MHz;
$n_f$=receiver front-end overall noise figure (≥1); and
$SNR_{min}$=minimum signal power-to-noise ratio at detector/demodulator input.

Minimizing the value of receiver $n_f$ requires the noise factor of amplifiers, mixers and filter circuits in the receive path to be kept to a minimum bearing in mind that gain also needs to be kept sufficiently high for reliable operation. However, the noise and gain performance of these receiver circuits are proportional to circuit power consumption. Moreover, minimizing the $SNR_{min}$ of a receiver necessitates a demodulator design having a multi-bit representation of the baseband signal. The number of bits in an analog-to-digital converter (ADC) required to produce this multi-bit representation is similarly proportional to circuit power consumption. Designing a low-power transceiver therefore involves a trade-off between transceiver power efficiency and receiver noise performance, and therefore circuit power consumption.

In the prior art, both direct conversion and low-intermediate frequency (IF) receiver architectures have been used in integrated low-power transceivers [1, 2]. The direct conversion technique requires low design complexity. However, it is particularly susceptible to noise and non-linearities in the mixer circuit, resulting in a high receiver $n_f$. This architecture has been shown to achieve the required minimum IEEE 802.15.4 sensitivity specification, but with little margin [3]. Hence this architecture is limited in its ability to trade power efficiency against noise performance.

Two baseband decoding or demodulation schemes are used in low-IF receiver topologies, these being known as coherent and non-coherent. Coherent schemes require the signal to have a high degree of coherency, i.e. to be relatively free of timing errors such as phase jitter or frequency variation. Non-coherent schemes are designed to be resilient against timing errors. Coherent schemes can achieve values of $SNR_{min}$ that approach the theoretical limit, but this is achieved at the expense of higher circuit power consumption due to the need for a relatively complex receiver topology and the requirement for a relatively high ADC resolution of around 8 bits. Non-coherent schemes however trade a high value of $SNR_{min}$ in return for low circuit power consumption due to a simpler receiver topology and lower ADC resolution requirements.

FIG. 11 is a schematic drawing of a prior art coherent scheme as described by Koteng [4]. The coherent demodulator comprises a channel filter 1102 connected to the output of the radio frequency (RF) front-end of the transceiver (not shown). The channel filter 1102 is fed by an in-phase component of the digital baseband signal ($I_{BB}$) and an out-of-phase component of the digital baseband signal ($Q_{BB}$). The channel filter is generally used to attenuate all the channels and noise outside the wanted channel. The channel filter 1102 is connected to a frequency and phase compensator 1104. The frequency and phase compensator 1104 is further connected to a frequency and phase estimator 1106. The frequency and phase estimator 1106 is used to estimate the frequency and phase of the incoming baseband signal. The frequency and phase compensator 1104 is used to correct the continuous rotation of the signal constellation of the received signal, which results from a transmitter and receiver local oscillator offset at the receiver. The frequency and phase estimator 1106 also detects the preamble in the received signal, which is used for frequency and phase compensation. The frequency and phase compensator 1104 is connected to a correlator 1108. The correlator 1108 compares the values of the $I_{BB}$ and $Q_{BB}$ signals with the 32 bit-chip values of the 16 symbols specified by the IEEE 802.15.4 standard. These 32 bit-chip values are stored in a look-up table accessible by the correlator 1108. The correlator 1108 is connected to a maximum decision unit 1110. The maximum decision unit 1110 takes the result from the correlator 1108, i.e. the correlation between the baseband signal and the chip values of the 16 symbols, and makes a decision regarding which symbol has been transmitted. This may be achieved by the maximum decision unit 1110 by finding the maximum correlation value. The symbol having the maximum correlation value is then fed to a frame synchronization unit, or frame sync unit 1112. The frame sync unit 1112 may use the correlation for the zero-symbol to ensure the correct timing such that the subsequent symbols are in sync with the zero-symbol.

The coherent demodulator described above has a simpler correlation algorithm compared to a non-coherent demodulator in that it uses a single correlation rather than a double correlation. A single correlation can be carried out using the following relationship for the correlation function C(s):

$$C(s) = \sum_{n=d}^{31} y_n * s_{s,n}$$

where 'y' is the received baseband signal and 's' is pseudo-random noise (PN) direct sequence spread-spectrum chip code of the symbols specified by the IEEE 802.15.4 standard.

However, the phase and frequency compensator 1104 and the frequency and phase estimator 1106 required before the correlator 1108 result in a high required signal resolution and high complexity of hardware. Furthermore, the phase and frequency estimation needs to be completed during the preamble (i.e. during training) and insufficient correction accuracy will results in loss of functionality.

FIG. 12 is a schematic drawing of a prior art non-coherent scheme as described by Han and Choi [5]. The non-coherent demodulator comprises a delay and differential filter 1202 that is fed by the two baseband signals $I_{BB}$ and $Q_{BB}$. The differential filter 1202 is connected to a phase and frequency estimator 1206 and a phase and frequency compensator 1204. The phase and frequency compensator 1204 compensates for the frequency offset based on the estimated frequency offset from the phase and frequency estimator 1206. The phase and frequency estimator 1206 also performs preamble detection for detecting the transmitted preamble. The preamble detection is used to compensate the phase and frequency. Connected to the phase and frequency compensator 1204 is a double-correlator 1208. The double-correlator 1208 compares the values of the $I_{BB}$ and $Q_{BB}$ signals with the 32 bit-chip values of the 16 symbols from the IEEE 802.15.4 standard, with a delay or lag of up to 3 chips. These chip values are stored in a look-up table accessible by the double-correlator 1208. The double-correlator 1208 is connected to a maximum decision unit 1210 and a frame sync unit 1212 as described above.

In summary, there is a need for an IEEE 802.15.4 compliant wireless receiver which has low power consumption and at the same time has good noise and signal-to-noise performance, for example as quantified by the noise factor $n_f$ and the minimum baseband signal-to-noise ratio in the demodulator $SNR_{min}$.

SUMMARY OF THE INVENTION

According to a first aspect of the invention there is provided a receiver operable according to a standard to decode digital data from an analog signal (i.e. radio frequency or RF signal), comprising an analog front-end and a digital decoder. The analog front-end comprises a plurality of analog components including an analog signal input for receiving the analog signal, at least one amplifier arranged to amplify the analog signal, and an analog-to-digital converter (ADC) arranged to convert the amplified analog signal into a digital signal. The digital decoder comprises a digital signal input connected to the output of the ADC and a demodulator comprising a plurality of digital components connected to be driven by a clock signal having a chip frequency. The digital components include: a sampler operable to sample the digital signal at a sampling frequency which is a multiple of the chip frequency, a correlation unit operable to process a set of bits, referred to as a chip-code, in the sampled digitized signal and output therefrom a set of correlation values; wherein the set of correlation values is an indicator of likely mapping between the chip-code that has been processed and a set of possible chip-codes defined according to the standard; a symbol selection unit having the function of deciding which symbol has been received based on an analysis of each set of correlation values; and a frequency correction unit operable to output a frequency control signal for adjustment of the clock signal dependent upon the correlation values output from the correlation unit.

The post-correlation approach to frequency correction allows designs according to the invention to be implemented with simple hardware compared to approaches which require intervention prior to the correlator. Simple receiver topology and a semi-coherent demodulator, should deliver near theoretical limits of $SNR_{min}$. Hence an improvement of around 5 dB over the existing non-coherent architectures is possible. Therefore, the receiver circuits can be designed from high gain active components with relatively relaxed noise requirements. Furthermore, the demodulator is in the digital circuit domain, such that the 5 dB of noise improvement is achievable with a very low circuit power penalty.

Embodiments of the invention can be realized with a signal resolution of ≤4 bits, resulting in a loss of less than 0.5 dB compared with 8 bit signal resolution. There is no need for phase and frequency compensation to be carried out before the correlation, as in the prior art, since the phase and frequency compensation is done based on the correlation values computed by the correlation unit. The use of timing extraction after correlation based on the maximum of the correlation values allows for a continuous optimization of signal amplitude.

The frequency correction unit may be operable to increase or decrease the chip frequency for an amount of time based on a measurement of whether the maximum correlation value among each set of correlation values occurs earlier or later than predicted according to the chip frequency currently in use.

The receiver may further comprise a synchronization unit having an input connected to receive the frequency control signal from the frequency correction unit, and an output operable to output a clock signal at the chip frequency to the components of the demodulator, wherein the synchronization unit sets the chip frequency having regard to the frequency control signal.

The digital decoder may further comprise an averaging unit interposed between the correlation unit and the symbol selection unit, the averaging unit being operable to modify the correlation values output by the correlation unit by averaging each correlation value over a succession of time intervals spanning a timing window centered around a predicted correct detection time. Averaging each correlation value over a succession of time intervals in this way, before determining which symbol is received, can provide an improvement in noise performance of around 3 dB.

The receiver may further comprise a signal quality analysis unit comprising: an input connected to receive an analog received signal strength indicator (ARSSI) signal indicative of signal strength of the analog signal after its amplification; a processing part operable to assess on an ongoing basis how a measured performance attribute at the demodulator compares with a minimum value of that performance attribute required to satisfy the standard, thereby to determine an operating margin; and a control output connected to a control input of at least one component in the analog front end and operable to output a control signal based on the operating margin and the ARSSI signal.

The performance attribute may be, or may be derived from, one or more of baseband signal-to-noise ratio and noise factor. At least one amplifier has a gain which is controlled in use according to the front-end control signal.

Signal quality analysis based on a combination of analog received signal strength indication (ARSSI), correlation values and timing information, allows for the optimization the IF amplification chain by controlling the gain of one or more amplifiers present in the chain. A dynamic reduction in receiver power consumption is achieved if the input signal quality is more than sufficient to conform to the standard.

The ADC may have a bit resolution which is variable and controlled in use according to the control signal. The ADC may be operated with an ADC sampling frequency which is controlled in use according to the front-end control signal.

Scalability of number of bits and sampling frequency allows an additional trade-off to be made between receiver sensitivity and power consumption.

The receiver may further comprise an antenna connected to the analog signal input for receiving the analog signal wirelessly.

According to a second aspect of the invention there is provided a transceiver comprising a receiver and a transmitter having a digital part, including a modulator, integrated with the receiver's digital decoder, and an analog part integrated with the receiver's analog front end.

The transceiver will typically be implemented as a single chip which is clocked from an external clock to drive the transceiver components. Alternatively the transceiver may have a clock integrated therein.

A wireless personal area network may be provided comprising a plurality of transceivers each arranged in operative wireless communication with at least one other of the transceivers.

According to a third aspect of the invention there is provided a method of decoding digital data from an analog signal known to conform to a particular standard, the method comprising the steps of receiving the analog signal; amplifying the analog signal; converting the analog signal into a digital signal; and demodulating the digital signal at an chip frequency. The demodulating is carried out by: (a) sampling the digital signal at a sampling frequency which is a multiple of the chip frequency; (b) applying a correlation function to process a set of bits, referred to as a symbol, in the sampled digitized signal to compute a set of correlation values, wherein the set of correlation values is an indicator of likely mapping between the symbol that has been processed and a set of possible symbols defined according to the standard; and (c) deciding which symbol has been received based on an analysis of each set of correlation values, wherein the clock signal is adjusted dependent upon the correlation values.

The chip frequency may be increased or decreased for an amount of time based on a measurement of whether the maximum correlation value among each set of correlation values occurs earlier or later than predicted according to the chip frequency currently in use.

BRIEF DESCRIPTION OF THE DRAWINGS

For a better understanding of the invention and to show how the same may be carried into effect reference is now made by way of example to the accompanying drawings.

DETAILED DESCRIPTION

The following will describe a transceiver according to the IEEE 802.15.4 worldwide wireless standard. It will be appreciated that other wireless standards could be used, as will be described below.

In the IEEE 802.15.4 worldwide wireless standard data is encoded in one of 16 symbols, from 0 to 15. Each symbol has a chip value comprising 32 chips (or bits), also referred to as a chip code. The standard is packet based and all of the data and any preamble or synchronization messages are encoded and transmitted as symbols that are converted into one of the 32 chip codes according to the standard. Each of the 32 chips represents half a byte or 4 bits of data.

The channel frequencies reproduced in the IEEE 802.15.4 worldwide wireless standard range from 2.405 GHz to 2.480 GHz with increments of 5 MHz. However, for the purposes of the following it is assumed that a frequency of 2.405 GHz it used. It will be appreciated that any of the frequencies in the range specified above may be used.

Figure 1:
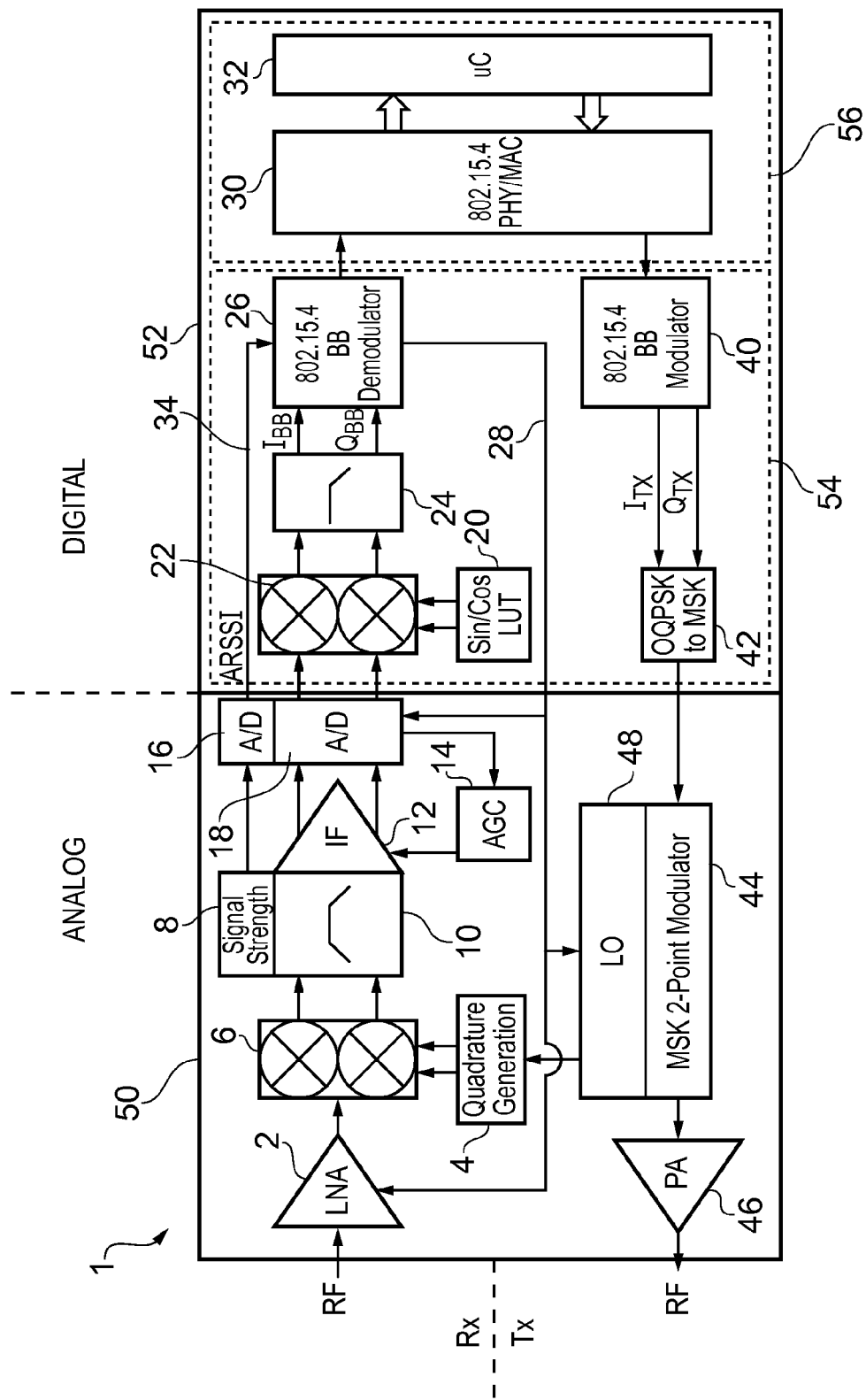
FIG. 1 shows a transceiver according to a first embodiment of the invention.

FIG. 1 shows a transceiver 1 according to a first embodiment of the invention. The transceiver 1 shown in the figure is an integrated system. The only required external components are an antenna, an oscillator crystal and a power supply decoupler. That is to say the transceiver may be implemented on one chip, i.e. in a single integrated circuit. However, it will be appreciated that although desirable for cost reasons, a single chip solution is not a technical necessity.

The transceiver 1 has a functional split into two parts, namely a receiver Rx and a transmitter Tx, as well as a hardware split into two parts, namely an analog unit 50 and a digital unit 52. The analog unit 50 provides a radio frequency (RF) front end for the transmitter and receiver. The digital unit 52 comprises a digital baseband (BB) processor 54 and a system control unit 56. Referring to FIG. 1, the receiver components 2, 6, 10, 12, 18, 22, 24, and 26 are arranged in the upper part of the drawing with the signal path from left to right, and the transmitter components 40, 42, 44 and 46 are arranged in the lower part of the drawing with the signal path from right to left. Both the receiver and transmitter components interact with the higher level control and processing components 30 and 32 visible in the right hand part of the drawing in the control unit 56. Again referring to FIG. 1, the analog RF front end 50 forms the left hand block of the drawing and the digital components in the digital unit 52 form the right hand block of the drawing. As will be appreciated the receiver signal is initially processed with analog components and subsequently processed with digital components, whereas the transmitter signal is initially formed digitally before being processed with analog components.

First the receiver is described.

Based on information for received signal quality and programmed environmental parameters (for example mode of deployment, fixed or moving device, maximum range etc.) the optimum operating point of the receiver can be determined where a device consumes an amount of power to operate reliably within the performance limits given by the IEEE 802.15.4 standard.

As already stated further above in the introduction, the sensitivity of a receiver can be calculated with the following relationship:

$$P_{min} = kT*BW*n_f*SNR_{min}$$

where:

kT=−174 dBm @ 25° C.;

BW=communication bandwidth (equivalent to chip rate for 802.15.4)=2 MHz;

$n_f$=receiver front-end overall noise figure (≥1); and $SNR_{min}$=minimum signal power-to-noise ratio at detector/demodulator input.

A perfect receiver would have $n_f$=1 which sets the theoretical limit for receiver sensitivity of:

$$P_{min\text{-}theoretical} = -113.2\ dBm$$

This value is calculated assuming a signal using offset quadrature phase shift keying (OQPSK) and using coding gain, processing gain and bandwidth according to IEEE 802.15.4.

The IEEE 802.15.4 specification requires a minimum sensitivity of:

$$P_{min\text{-}802.15.4} = -85.0\ dBm$$

so there is a gap of 28.2 dBm between the minimum requirement to conform with the standard and what is theoretically possible with a perfect receiver.

Using the design of the first embodiment, in particular the combined analog receiver front end design and the digital demodulator design, it should be possible to achieve approximately the following sensitivity:

$$P_{min\text{-}Target} = -105\ dBm$$

This provides a margin in which power consumption can be optimized of:

$$\Delta P_{min} = 20\ dB$$

which equates to a factor of 100. In other words, the receiver can be controlled in use to theoretically reduce its operating power by up to 100 times while still conforming to the standard.

The following areas in the receiver section are scalable.

Low noise amplifier (LNA): Bias Current $I_b$ $$P_{min} \sim n_f \approx 1 + \alpha/P_{Diss}$$

$$P_{Diss} = Vdd*I_b$$

A/D+Digital: Resolution N $$P_{min} \sim SNR_{min}$$

with a loss of around $\Delta P_{min} \approx 1$ dB between 4 and 3 bits resolution.

$$P_{Diss} \sim 2^N$$

A/D+Digital: Sampling Rate $f_s$ $$P_{min} \sim SNR_{min}$$

with a loss of around $\Delta P \approx 2$ dB between 4 and 16 MHz.

$$P_{Diss} \sim f_s$$

Local Oscillator (LO) voltage-controlled oscillator (VCO): Bias Current $I_b$

Reducing the VCO bias current $I_b$ within a range where the VCO is still safely oscillating primarily results in an increase in phase noise.

Automatic gain control (AGC) of an intermediate frequency (IF) amplifier

The receiver Rx comprises a low noise amplifier 2 (LNA) at the input connected to an antenna (not shown). The LNA is a high-gain amplifier with a target noise figure of ≤3 dB. The SNR or the sensitivity of the LNA 2 is controllable. The signal received by the LNA 2 is at a frequency of 2.405 GHz, as specified by the IEEE 802.15.4 standard. The output of the LNA 2 is electrically connected to a down conversion mixer 6 or a passive quadrature mixer. The down conversion mixer 6 combines the amplified signal with quadrature signals I and Q generated by a quadrature generation unit 4. The quadrature generation unit 4 provides quadrature signals I and Q, where Q is 90 degrees out of phase with I. The quadrature generation unit 4 is driven by a local oscillator 48 (LO), which produces a sine wave output at a frequency of 2.405 GHz±2 MHz, i.e. RF. The LO 48 may be a frequency synthesizer based on fractional-N phase locked loop (PLL) using a 3rd-order sigma-delta ($\Sigma\Delta$) modulator. However, it will be appreciated that other oscillators might be used. The LO 48 is also used by the transmitter Tx. The down conversion mixer 6 has two outputs, namely the in-phase component and the out-of-phase component.

The down conversion mixer 6 is connected to a bandpass filter 10 and an IF amplifier 12. The bandpass filter is used to remove the RF component from each of the two signals from the down conversion mixer 6. The signal strength of the IF signals that are fed into the bandpass filter 6 from the IF amplifier 12 are detected by a signal strength detection unit 8. The $I_{IF}$ and $Q_{IF}$ signal components and the signal strength output are fed into respective analog to digital converters 18, 16 (ADC). The $I_{IF}$ and $Q_{IF}$ signal components are fed into a dual input ADC and the signal strength output signal from the signal strength unit 8 is fed into a separate ADC. The resolution and the sampling frequency of the dual input ADC are controllable.

The dual-input ADC 18 and the IF amplifier 12 comprises an automatic gain control loop (AGC) comprising an AGC unit 14. The AGC unit 14 is fed by the digital output from the dual-input ADC 18. The AGC unit 14 determines whether or not the gain of the IF amplifier 12 is high or low enough for the input signal. If the signal is not high enough the gain of the IF amplifier 12 is increased and if the signal is too high the gain of the IF amplifier 12 is decreased. To determine whether or not the signal is too high or too low, the digital output is analyzed. For example, if the bits from the most significant bits of the digital output signal have a consistently 'low' or 'zero' value, it is determined that the gain of the IF amplifier 12 should be increased. That is to say, if the fifth bit to the eight bit of an 8 bit ADC have a consistently 'low' or 'zero' value, it is determined that the gain of the IF amplifier 12 should be increased.

A connection 34 is made from the ADC 16 (for the signal strength detection unit 8) to a demodulator 26. The connection 34 between the ADC 16 and the demodulator 26 is referred to as the analog received signal strength indication (ARSSI).

The digital outputs for the $I_{IF}$ and $Q_{IF}$ signal components are fed into a digital intermediate frequency-to-baseband (IF-to-BB) down conversion mixer 22. The down conversion mixer 22 is also fed by a Sin/Cos look-up table (LUT) 20. The Sin/Cos LUT 20 provides a digitized version of a sine wave and digitized version of a 90 degree out-of-phase signal, namely a cosine wave. The Sin/Cos LUT 20 outputs the digitized sine and cosine waves, which have a frequency of 2 MHz, but are processed at a sampling rate of 4-16 MHz. For the purposes of the following it is assumed that a sampling rate of 16 MHz is used. The digitized sine and cosine signals from the Sin/Cos LUT 20 are multiplied with the $I_{IF}$ and $Q_{IF}$ signal components in the down conversion mixer 22.

The in-phase and out-of-phase components output from the down conversion mixer 22 are then fed into a low pass filter 24, before being fed into the demodulator 26. The low pass filter 24 removes the IF frequency component from the in-phase and out-of-phase signals fed from the down conversion mixer 22, such that the BB component of each of the in-phase and out-of-phase signals ($I_{BB}$ and $Q_{BB}$) is output. The BB signals $I_{BB}$ and $Q_{BB}$ having a bandwidth of 2 MHz and a chip frequency of 2 MHZ, as specified by the IEEE 802.15.4 standard. The chip frequency or chip rate is used to describe the frequency or rate of the chips in the received signal.

The demodulator 26 is a semi-coherent baseband demodulator. The operation of the semi-coherent baseband demodulator is based on maximum detection of the correlator output, more particularly maximum likelihood (ML) time-delayed double correlation and continuous frequency correction during packet reception.

The demodulated output is in the form of the transmitted packet of bytes of data, as specified by the IEEE 802.15.4 standard, which is fed to an integrated 802.15.4 upper physical layer (PHY) and media access control (MAC) layer unit 30. This is connected to a multipurpose microcontroller 32. The microcontroller 32 may also be connected to at least one input device (e.g. temperature sensor) and/or at least one controllable device (e.g. heater).

The demodulator 26 also comprises a number of output connections 28, which are used to control the LNA 2, the LO 48, and the ADC 18.

The transmitter Tx is now described. The transmitter comprises a modulator 40 that is connected to the 802.15.4 PHY/MAC unit 30. The 802.15.4 PHY/MAC unit 30 outputs a packet of data to be transmitted in the form of a number of bytes as specified by the IEEE 802.15.4 standard. The modulator 40 is a standard modulator, as is known in the art to produce both the in-phase and out-of-phase components ($I_{Tx}$ and $Q_{Tx}$) of the symbols to be transmitted. The symbols to be transmitted are modulated such that the in-phase component $I_{Tx}$ comprises the even bits and the out-of-phase component $Q_{Tx}$ comprises the odd bits of the 32 chip symbols. The in-phase and out-of-phase components are then shaped using half-sine pulse shaping. The in-phase and out-of-phase components shaped with half-sine pulse shaping are then output to an OQPSK-to-MSK converter 42.

The modulated $I_{Tx}$ and $Q_{Tx}$ signals are then combined to a minimum shift keying (MSK) format in the OQPSK-to-MSK converter 42. The digital output from the OQPSK-to-MSK converter 42 is fed to a MSK 2-point modulator 44, as is known in the art, i.e. a dual-point MSK modulation architecture. Frequency synthesis is provided by the LO 48. The MSK 2-point modulator 44 modulates the LO 48 signal based on the digital output from the OQPSK-to-MSK converter 42.

The modulated signal from the MSK 2-point modulator 44 is fed to a power amplifier (PA) 46, which has programmable output power. PA 46 is connected to an antenna (not shown) for transmission of the signal.

Figure 2:
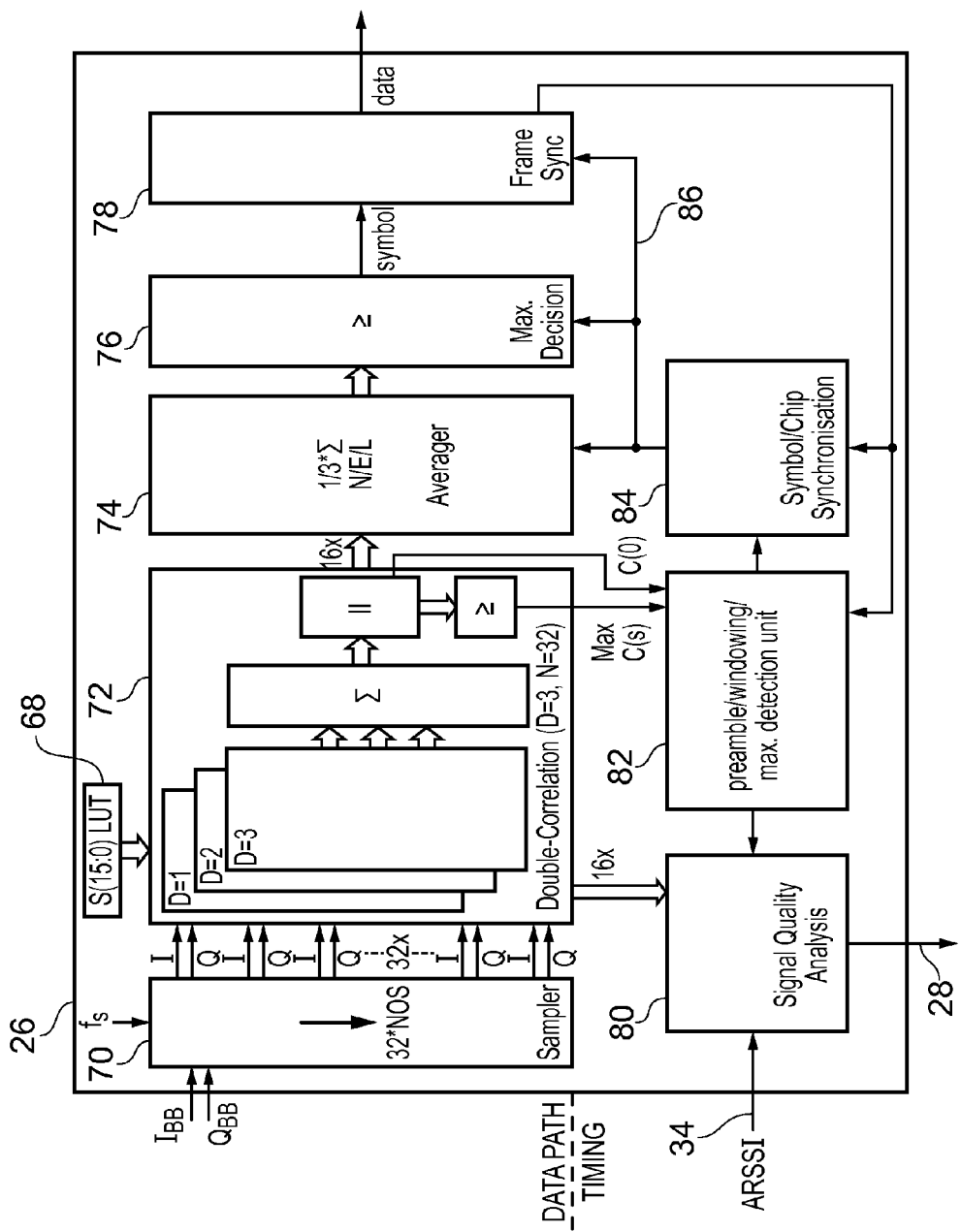
FIG. 2 shows a demodulator part of the transceiver of FIG. 1.

FIG. 2 shows a schematic illustration of the demodulator 26 shown in FIG. 1.

The demodulator 26 is divided into an upper data path portion and a lower timing portion. The upper data path portion comprises a sampler 70, a double-correlator 72, an averaging unit 74, a maximum decision unit 76 and a frame synchronization unit 78. The upper data path has a data path running from left to right. The lower timing portion comprises a preamble/windowing/maximum detection unit 82 and a symbol/chip synchronization unit 84. The demodulator 26 also comprises a signal quality analysis unit 80, which provides the control for the LNA 2, the ADC 18 and the LO 48, shown in FIG. 1.

The in-phase and out-of-phase signal components $I_{BB}$ and $Q_{BB}$ from the low pass filter 24 shown in FIG. 1 are fed into the sampler 70. The sampler 70 has a further input $f_s$ for the sampling signal. The sampling frequency is set to be 2, 4 or 8 times the transceiver's chip frequency ($f_{chip}$) or chip rate to provide oversampling at a ratio of 2, 4 or 8 respectively, the oversampling ratio being referred to as NOS. The oversampling ratio is defined as $f_s/f_{chip}$, (n.b. $f_{chip}$=2 MHz according to IEEE 802.15.4). For this example it is assumed that the sampling frequency $f_s$ is 16 MHz or 8 times the chip frequency of 2 MHz. The sampler 70 samples 32 chips (i.e. 32 chips for one symbol) of the incoming signal in the form of 16 chips from the in-phase component and 16 chips from the out-of-phase component. The 32 chips sampled by the sampler 70 are then fed into a double-correlator 72 or correlation unit. The chip frequency is set at 2 MHz, but the sampling is carried out at 16 MHz with an oversampling ratio of 8. Therefore, it will be appreciated that the received signal is sampled 32 times the oversampling ratio to effectively sample a 32 chip symbol. In other words, for a 32 chip symbol 256 points are sampled. Thus, for each chip of the 32 chip symbol there are 8 sampled points when using an oversampling ratio of 8. This process is repeated over time by repeatedly sampling the incoming signal. It will be appreciated that the receiver 1 is constantly sampling and demodulating the received signal, since many symbols are transmitted, which will form a packet because the IEEE 802.15.4 standard is packet based.

The double correlator 72 has 16 outputs for C(15:0), namely the correlation values between the sampled signal (i.e. the sampled received signal) and the 16 known 32 chip symbols or chip codes, as specified in the IEEE 802.15.4 standard. The 32 chip symbols are provided to the double-correlator 72 by a LUT 68. The correlator 72 also outputs the maximum of the correlator outputs Max C(s). The maximum correlator output value Max C(s) is taken to be the maximum correlator output of each of the 16 outputs at a given sampling point. It will be appreciated that the sum could also be used to represent the maximum correlator output Max C(s). The maximum correlator output is fed to the preamble/windowing/maximum detection unit 82 in the timing portion of the demodulator 26.

The correlator outputs C(15:0) are fed to an averaging unit 74. The averaging unit 74 calculates an average of a now, an early and a late point of each of the correlator outputs. The now, early and late points are defined in more detail below. The averaged correlator outputs C(15:0) values are then fed to the maximum decision unit 76. It will be appreciated that the averaging unit 74 may be omitted and the correlator outputs C(15:0) fed from the double-correlator 72 to the maximum decision unit 76 or symbol selection unit.

Averaging over now/early/late values of the correlator outputs C(s) before making the maximum likelihood decision gives an improvement of around 3 dB in $SNR_{MIN}$ for an oversampling ratio of 8 (NOS=8), and still around 1 dB at the Nyquist sampling rate (NOS=2). This brings the $SNR_{MIN}$ performance close to the theoretical limit of 2.2 dB for (coherent) demodulation of IEEE 802.15.4 using OQPSK.

The maximum decision unit 76 selects the correlator output having the maximum value, based on a comparison between each of the correlator values also known as a maximum likelihood test. The correlator output having the maximum value is deemed to be the transmitted symbol. The maximum decision unit 76 then outputs the symbol having the maximum correlator output to the frame synchronization unit 78. The frame synchronization unit 78 synchronizes the transmitted frame or packet to be output from the demodulator 26. That is to say the frame synchronization unit 78 synchronizes the received symbols, such that the data are output in the correct packet form. As is shown in the figure each of the averaging unit 74, the maximum decision unit 76 and the frame synchronization unit 78 are also fed by the symbol/chip synchronization unit 84. The symbol/chip synchronization unit 84 provides the timing information for each of these elements via a timing connection 86. The timing connection 86 provides the synchronization within the demodulator 26, such that the chips/symbols are detected at the correct point in time.

The timing portion is now discussed.

The preamble detector 82 is used to identify the preamble section of the received data packet. In the IEEE 802.15.4 standard, the preamble comprises 8 repeats of the zero symbol S(0).

The preamble detector 82 receives the Max C(s) signal and the correlator output for the zero symbol S(0), namely C(0). During the preamble part of the received packet, it is known that only zero symbols are transmitted; therefore, this is used to establish the frequency and phase of the transceiver to correspond with the received data in the symbol/chip synchronization unit 84. The output from the preamble detection unit 82 is fed to the symbol/chip synchronization unit 84, also referred to as a frequency correction unit. The symbol/chip synchronization unit 84 provides the synchronization timing in the form of a chip-clock. The term chip-clock is used to describe a clock that is operating at the chip frequency, i.e. 2 MHz. The symbol/chip synchronization unit 84 may also provide a symbol clock, which is a multiple of the chip-clock, i.e. 1/32 times the chip-clock e.g. 62.5 KHz. The chip-clock is provided by the symbol/chip synchronization unit 84 via the timing connection 86. The chip-clock can be corrected/adjusted by the symbol/chip synchronization unit 84 by altering the NOS momentarily, since the sampling frequency is fixed. The correction/adjustment is carried out to ensure that the receiver LO is synchronized with the received signal. The symbol/chip synchronization unit 84 also ensures that the averaging unit 74, the maximum decision unit 76 and the frame synchronization unit 78 are operating at the correct synchronization point with the received data via timing connection 86, since these elements of the demodulator are working at the chip/symbol level.

The demodulator 26 also contains a signal quality analysis unit 80. The output connection 34 of the signal quality analysis unit 80 is fed back to the analog front end of the receiver. The signal quality analysis is based on the analog received signal strength indication (ARSSI) from connection 34 (this being the digitized output from the signal strength unit 8), the double-correlator 72 and the preamble detection unit 82. The signal quality analysis unit 80 provides a control output on line 28. The control output from the signal quality analysis unit 80 is supplied as an input to components in the analog block 50, in particular to the LNA 2, where it is used as a control parameter to adjust the SNR or the sensitivity when the input signal quality to the demodulator 26 is judged to exceed the requirements of the standard (or some more stringent requirement threshold). A dynamic reduction in receiver power consumption can thereby be effected by reducing SNR or the sensitivity in one or more of the RF front end amplification components. It will be appreciated that as a result of by reducing SNR or the sensitivity, the gain might also be reduced. The control output 28 is also fed to the ADC 18 where it is used as a control parameter to adjust the number of bits of resolution of the ADC and/or the sampling frequency of the ADC in the sense that, when the input signal quality to the demodulator 26 is judged to exceed the requirements of the standard (or some more stringent requirement threshold), the number of bits can be reduced and/or the sampling frequency can be reduced, thereby reducing receiver sensitivity to reduce power consumption. The control output 28 is further input to the LO 48 where it is used as a control parameter to adjust the bias current of the LO 48, thereby reducing the power consumed by the LO 48, while increasing the phase noise within practical limits. It will be appreciated that any permutation of these possible control loops may be envisaged so that, for example, feedback control from the demodulator 26 may only be exercised on one or two of the LNA 2, LO 48 and ADC 18.

Figure 3:
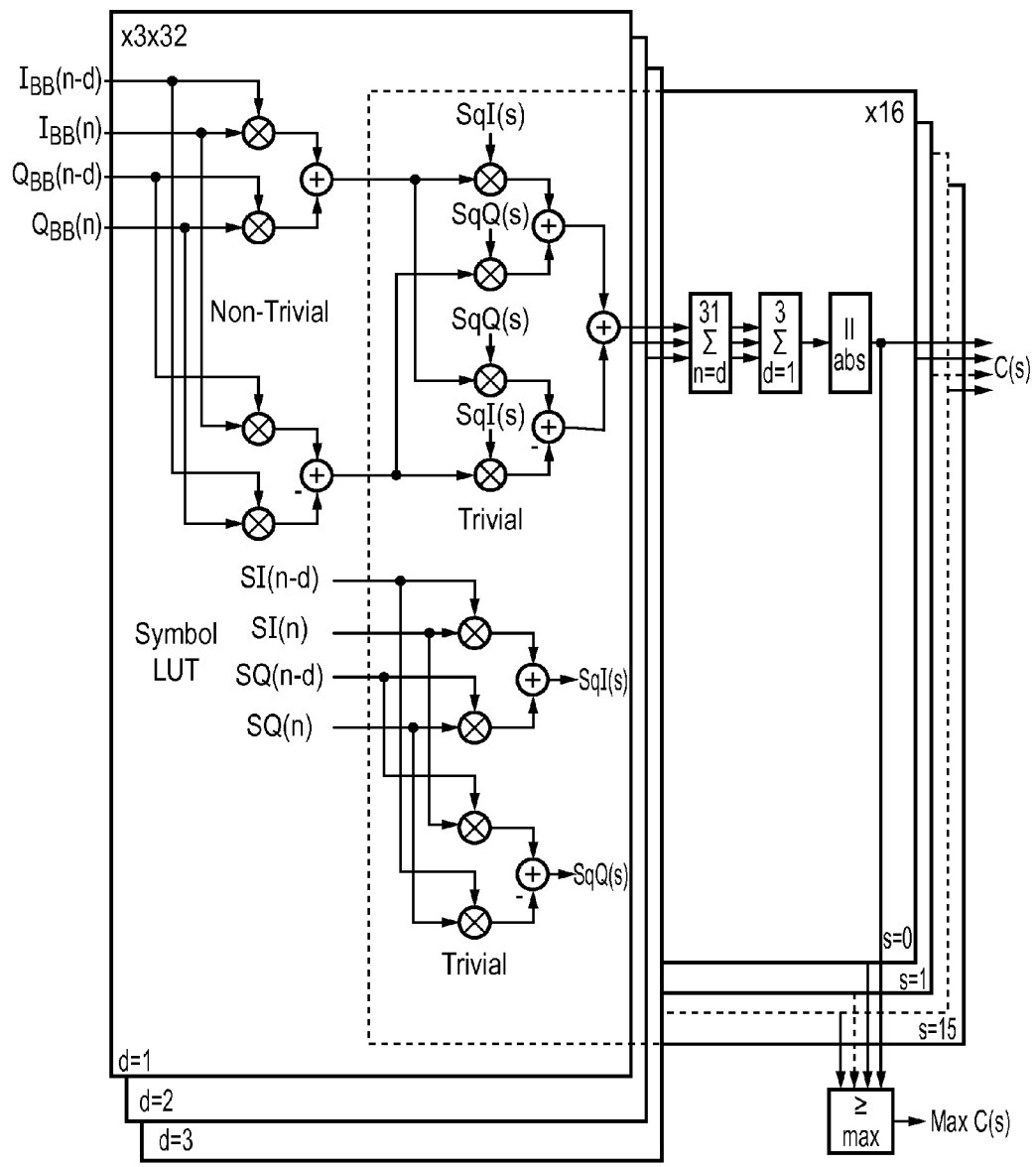
FIG. 3 shows a double correlator unit of the demodulator of FIG. 2.

FIG. 3 shows a representation of the double-correlator 72, shown in FIG. 2.

The double correlation algorithm is shown below:

$$c(s) = \left| \sum_{d=1}^{3} \sum_{n=d}^{31} y_n^* * y_{n-d} * s_{s,n} * s_{s,n-d}^* \right|$$

with:

$$R(x(n-d)*x^*(n))=Rx(n-d)*Rx(n)+Tx(n-d)*Tx(n)$$

$$T(x(n-d)*x^*(n))=Tx(n-d)*Rx(n)+Rx(n-d)*Tx(n)$$

Received baseband signal yn:

$$y_n=I_{BBn}+jJ_{BBn}$$

Pseudo-random noise (PN) direct sequence spread-spectrum chip code of symbol s:

$$s_s=SI_s+jSQ_s$$

Parameters: Number of symbols:

s=0-15

Number of chips per symbol:

n=0-31

Lag delay of chips (or bits):

d=1-3

Post-processing (averaging) is carried on the above correlation results C(s) to obtain a value for Max C(s) as already described above.

Figure 4:
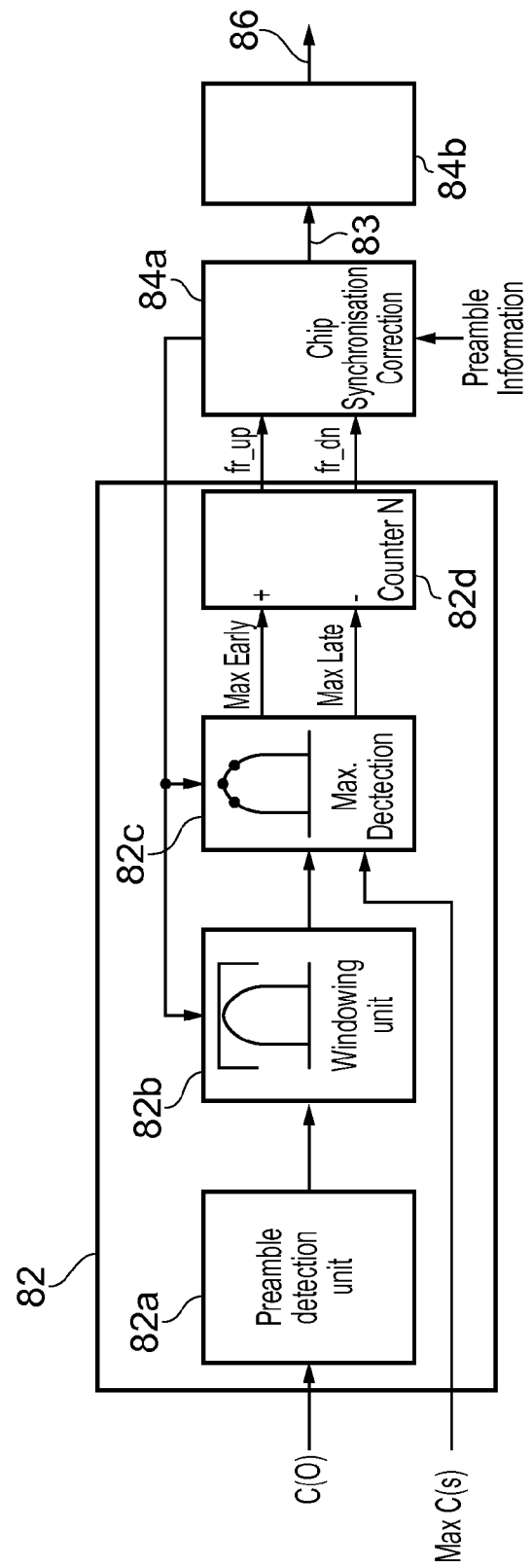
FIG. 4 shows a now/early/late detection unit of the demodulator of FIG. 2.

FIG. 4 shows the preamble/windowing/maximum decision unit 82 shown in FIG. 2 and the symbol/chip synchronization unit 84 is divided into two parts 84a, 84b. The preamble/windowing/maximum decision unit 82 is shown here with four blocks, namely a preamble detection unit 82a, a windowing unit 82b, a maximum detection unit 82c and a counter 82d.

The preamble detection unit 82a is fed by the correlator output for the zero symbol. This is because the preamble comprises 8 zero symbols transmitted one after the other. Therefore, to detect the preamble it is only necessary to determine whether or not zero symbols are being successively received. When it is determined that the preamble is being received, the preamble detector controls the windowing unit 82b to begin investigating the incoming signal to determine a window for carrying out correction/adjustment of the chip frequency (or chip rate).

The windowing unit 82b is used to prevent cross correlation between adjacent bits. The windowing unit 82b determines the position of a sampling window that is used to carry out correction of the chip frequency. The determination of the window position is carried out during the preamble stage, since a known symbol is being received. The window position is centered at the point when the correlator output for the zero symbol is at a maximum value. The sampling window is typically between 2 and 4 chips, since there is pattern repetition in the IEEE 802.15.4 standard chip codes. The term 'chip' being used to identify a bit in the 32 chip symbol. The point in time when the correlator output for the zero symbol is at a maximum value is taken to be the 'now' point or the point in time when a symbol is received. In this case it is known that the zero symbol is received. Once the preamble is no longer being received and the remainder of the packet is being received, the 'now' point is kept in the same position, albeit with some correction/adjustment. It will be appreciated that successive 'now' points coincide with a "symbol rate", which is 1/32 times the chip rate i.e. 62.5 KHz. That is to say that continuous estimation and correction during the rest of the frame or packet is used, within the window specified during the preamble stage.

The maximum detection unit 82c is fed by the windowing unit 82b. The maximum detection unit 82c investigates the maximum correlator output Max C(s) for the correction or adjustment of the chip frequency. The 'now' sampling point was determined by the windowing unit from the preamble section and is passed to the maximum detection unit 82c. The maximum detection unit 82c takes three values from the maximum correlator output Max C(s). These values are the Max C(s) values at the 'now' point, the 'early' point and the 'late' point. The 'now' point, as discussed above is the sampling point at which a symbol is deemed to have been received, as determined by the windowing unit 82b. The 'early' point is the point that is typically no more than two chips ahead (after) the 'now' point. That is to say that the 'early' point is no more than 16 samples ahead of the 'now' point (i.e. at an oversampling ratio of 8, there are 8 samples per chip). The 'late' point is a point that is typically no more than two chips behind (before) the 'now' point. That is to say that the 'late' point is no more than 16 samples behind of the 'now' point. The 'early' and 'late' values are then compared in the maximum detection unit 82c. If the value of the 'early' maximum correlator output is greater than the value of the 'late' maximum correlator output, the sampling point is considered to be early. Alternatively, if the value of the 'late' maximum correlator output is greater than the value of the 'early' maximum correlator output, the sampling point is considered to be late. The maximum detection unit 82c feeds a maximum early and a maximum late signal to the counter 82d. The maximum 'early' and maximum 'late' signals could be high or low dependent on the result of the comparison between the 'early' and 'late' values. If the 'early' value is greater than the 'late' value, the maximum 'early' signal is high and the maximum 'late' signal is low. Alternatively, if the 'late' value is greater than the 'early' value, the maximum 'late' signal is high and the maximum 'early' signal is low.

It will be appreciated that in principle the now/early/late detection could operate with only 2 sampling points rather than the 3 of this example, e.g. now/early or late/now points, using a comparison between the now/early or late/now points respectively. Moreover, the now/early/late detection could operate with more than 3 sampling points, for example 4, 5, 6, 7, 8, 9 or 10. Higher numbers of sampling points would only potentially be beneficial if the NOS is increased. Our calculations would indicate that there is no benefit of going above 3 sampling pints (i.e. now/early/late) with an oversampling ratio of 8, so the real advantage of having higher numbers of sampling points may be limited or non-existent in practice.

The counter 82d connected to the output of the maximum detection unit 82c maintains a counter value N which is used to trigger an adjustment of the chip frequency when the counter reaches a threshold. The counter may be configured such that a threshold is reached when there are N consecutive 'early' maxima or N consecutive 'late' maxima. Alternatively, the counter can be respectively incremented or decremented each time an 'early' or 'late' maximum is sensed, so that the threshold is reached after the crawling count value reaches a positive or negative threshold. In either case when the threshold is reached, the counter value is reset to zero. We assume the latter option is used in the following description. In both cases N is preferably greater than 1 to provide some noise immunity, thereby avoiding spurious corrections. For example, N may be 2, 3, 4, 5, 6, 7, 8, 9 or 10 with optimum values likely to be in the range 2 or 3 to 5, 6 or 7.

The counter unit 82d has two outputs, a frequency_up output and a frequency_down output, which are connected to a chip synchronization correction unit 84a. The chip synchronization correction unit 84a is part of the symbol/chip synchronization unit 84 shown in FIG. 2. If the counter value N reaches the positive or negative threshold, the frequency_up or frequency_down output will be set high accordingly. That is to say if the counter value N in the counter unit 82d reaches the positive threshold value, the frequency_up output is set high and if the counter value N in the counter unit 82d reaches the negative threshold value, the frame_down output is set high.

The chip synchronization correction unit 84a is connected to a chip/symbol clock unit 84b, via connection 83. The chip/symbol clock unit 84b provides the chip-clock at the chip frequency via connection 86. The timing signal is output from the chip synchronization correction unit 84a via connection 83 to either increase or decrease the chip frequency for a limited time interval according to the frequency_up and frequency_down outputs. The chip-clock is at the chip frequency $f_{chip}$, of 2 MHz for the majority of the operation of the demodulator 26, except when an adjustment of the chip-clock is required. The adjustment of the chip-clock has the indirect effect of changing the oversampling ratio NOS even though the sampling frequency itself $f_s$ is unchanged. It is noted that the sampling frequency is typically fixed by an oscillator. As discussed above a sampling frequency of 16 MHz is used. For example, if the frequency of the chip-clock is momentarily increased (frequency_up is set high) to approximately 2.3 MHz, the oversampling ratio will be decreased to approximately 7. This shifts the 'now' sampling point one sample period to the left (or one sampling point earlier). Alternatively, if the frequency of the chip-clock is decreased (frequency_down is set high) to approximately 1.8 MHz, the oversampling ratio will be increased to approximately 9. This shifts the 'now' sample point one sample period to the right (or one sample point later). It will appreciated that the oversampling ratio might be altered in the range from 6 to 10 (or the frequency of the chip-clock is altered in the range of 2.7 MHz to 1.6 MHz respectively). Other oversampling ratios are also envisaged, ranging from 1 to 16 (or a chip frequency from 16 MHz to 1 MHz respectively).

It is noted that same effect may be achieved by inserting a phase delay in the chip-clock signal. However, adjustment of the chip-clock has been adopted as the solution here in view of its convenience and simplicity. What is important is to implement the desired phase shift between the clock signal and the timing of the correlations by the desired integer number of sampling points.

The term 'momentarily' is used above to describe the time period for which an increased or decreased frequency of the chip-clock. Following this temporary increase or decrease of the chip frequency or chip-clock to shift the sampling position, the chip frequency or chip-clock is returned to 2 MHz.

The duration of the increased or decreased chip frequency or chip-clock will be one clock cycle or period of the chip-clock. The oversampling ratio used to shift the 'now' point is determined by the position of the 'early' and 'late' sampling points relative to the 'now' point.

For example, if the 'early' sampling point is one sample period (i.e. 0.0625 µs) away from the 'now' sampling point, the 'now' sampling point is shifted one sampling period to the right, so that the 'now' sampling point will be moved to the current position of the 'early' sampling point. A sampling point is referred to here as a sampling point of the sampler 70, i.e. sampling points having a period of 0.0625 µs determined by the 16 MHz sampling frequency. The 'now' sampling point is be shifted one sampling period to the right by using an oversampling ratio of 9 for one period of the chip-clock. That is too say that for one clock cycle, the period of the chip-clock is set to 0.5625 µs (instead of 0.5 µs for a frequency of 2 MHz), which corresponds to the chip-clock having a period of 9 sampling periods of the sampler 70. It will be appreciated that to shift the 'now' sampling point by two sampling periods to the right (i.e. the 'early' sampling point is two sample periods away from the 'now' sampling point), an oversampling ratio of 10 could be used with a chip-clock period for one clock cycle of 0.625 µs.

For example, if the 'late' sampling point is one sample period (i.e. 0.0625 µs) away from the 'now' sampling point, the 'now' sampling point is shifted one sampling period to the left, so that the 'now' sampling point will be moved to the current position of the 'late' sampling point. The 'now' sampling point is shifted one sampling period to the left by using an oversampling ratio of 7 for one period of the chip-clock. That is too say that for one clock cycle, the period of the chip-clock is set to 0.4375 µs (instead of 0.5 µs for a frequency of 2 MHz), which corresponds to the chip-clock having a period of 7 sampling periods of the sampler 70. It will be appreciated that to shift the 'now' sampling point by two sampling periods to the left (i.e. the 'late' sampling point is two sample periods away from the 'now' sampling point), an oversampling ratio of 6 could be used with a chip-clock period for one clock cycle of 0.375 µs.

The output from the chip synchronization correction unit 84a is also fed back to the windowing unit 82b and the maximum decision unit 82c for timing purposes, such the now/early/late points used by these are at the correct timing point.

Figure 5:
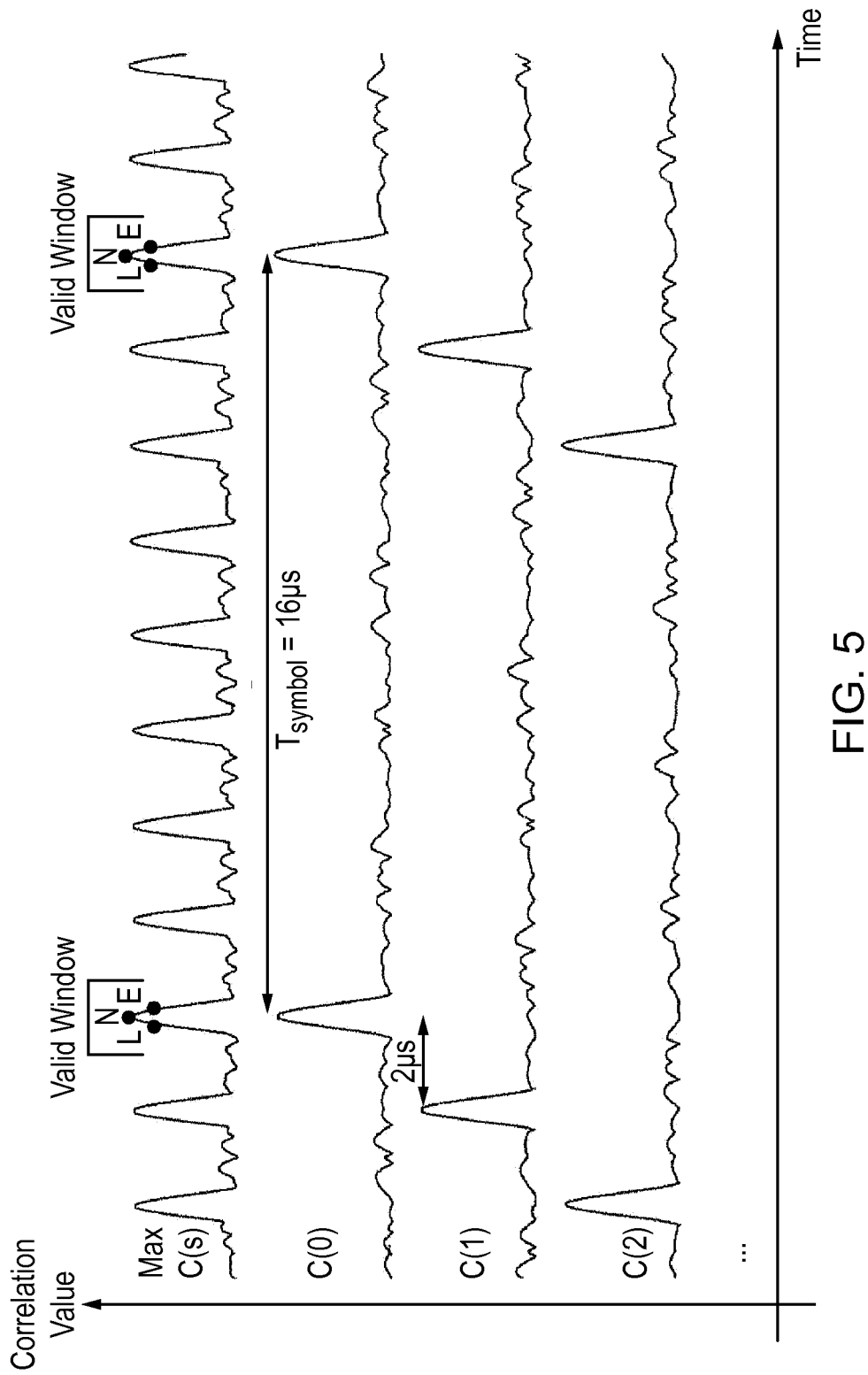
FIG. 5 shows an example output waveform from the double correlator unit.

FIG. 5 shows the correlator outputs from the first three correlators C(0), C(1) and C(2) against time for the received zero symbol. C(0) is the correlation between S(0) and the received signal. C(1) is the correlation between S(1) and the received signal. C(2) is the correlation between S(2) and the received signal. In addition the maximum correlation value Max C(s) is plotted (the uppermost line). The maximum correlation value Max C(s) is taken to be the maximum of all the correlator outputs at each sampling point in this embodiment. However, alternative methods of calculating Max C(s) values are discussed above. The fact that there is repetition in the chip codes as provided for by IEEE 802.15.4 is evident, since the correlation peaks in C(0), C(1) and C(2) are separated by 4 time increments representing their mutual separation by 4 chips. The correlation maxima between adjacent codes are thus 2 µs apart which equates to 4 chip periods. The size of the sampling window is also marked on the graph. The sampling window has the effect of masking out the cross-correlation due to the repetition in the chip pattern, as discussed above. The position of the sampling window coincides with the correlator output for the zero symbol, since the correlator outputs shown in the figure correspond to a zero symbol, which is known to be true during the preamble stage.

Figure 11:
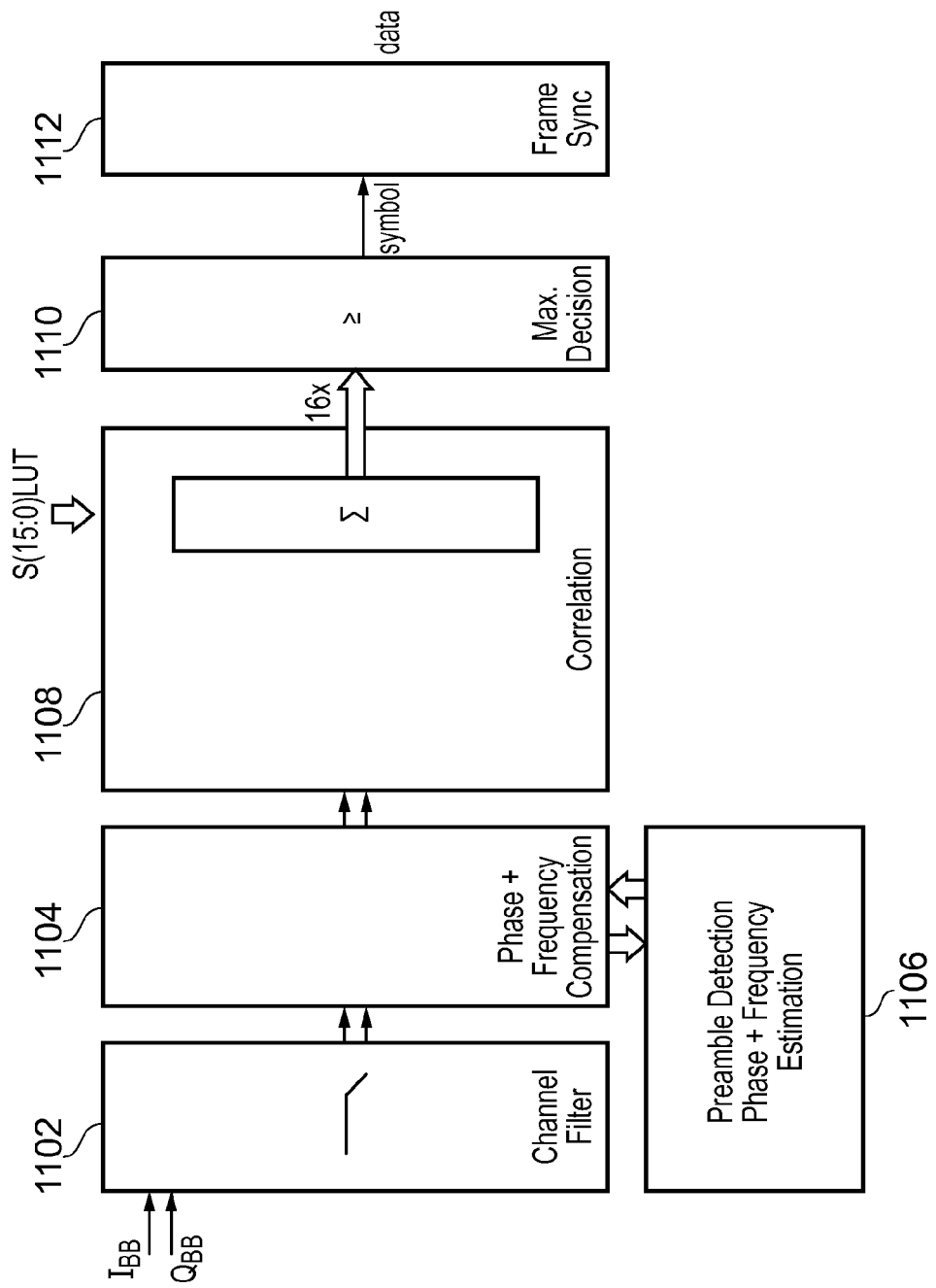
FIG. 11 shows a coherent demodulator of a prior-art transceiver according to Koteng [4]
Figure 12:
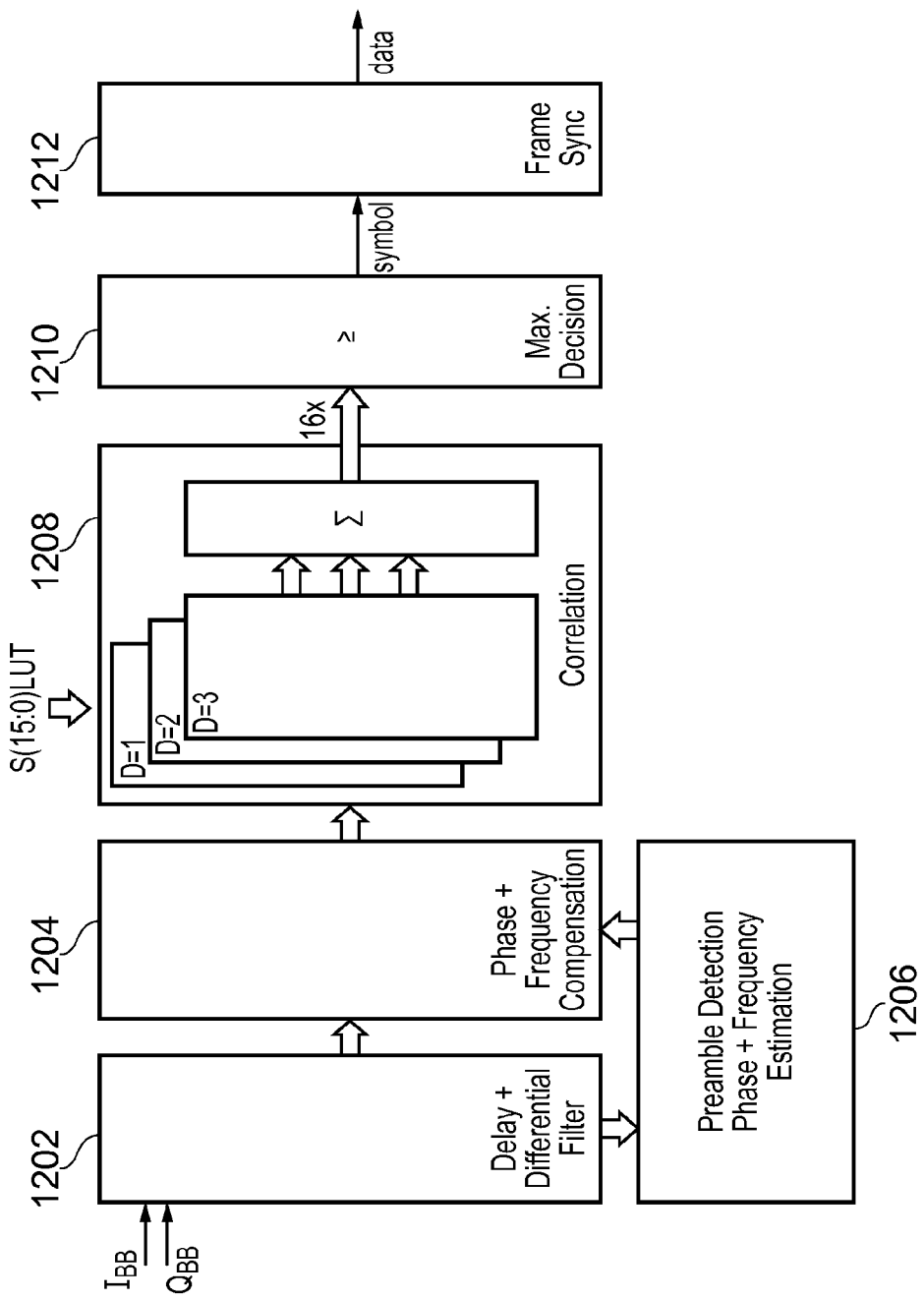
FIG. 12 shows a non-coherent demodulator of a prior-art transceiver according to Han and Choi [5].

As can be seen from the demodulator in FIG. 4, the scheme for phase and frequency compensation adopted here differs from the prior art designs of FIGS. 11 and 12 in that phase and frequency compensation is carried out after the correlator, instead of before it, by adjusting the oversampling ratio NOS by momentarily increasing or decreasing the chip frequency of the receiver according to a now/early/late approach. Implementations according to the apparatus and method described here can operate with relatively low signal resolution which means the ADC only need consume relatively little power. For example, with the design adopted here a resolution of ≤4 bits in ADC 10 is usually sufficient. The deleterious effect of having such a coarse ADC resolution is surprisingly small, resulting in losses of less than 0.5 dB compared to ideal resolution (∞). By way of comparison, coherent detection according to the prior art example of FIG. 11 requires the phase and frequency de-rotation to be performed with high precision so a high ADC resolution is necessary: typically ≥8 bits. The other prior art option according to the FIG. 12 example of non-coherent BB detection has significantly worse performance (i.e. $SNR_{MIN}$>4 dB) than the OQPSK method adopted here.

In example implementations of the design approach here, frequency offset tolerances close to 100 ppm can be achieved which compares favorably with the IEEE 802.15.4 requirement of 80 ppm. The hardware overhead associated with implementation of the timing extraction and synchronization algorithms is low compared with prior art approaches which implement the timing extraction and synchronization algorithms as part of the correlator core.

Signal quality analysis based on combination of analog received signal strength indication (ARSSI), correlation values and timing information allows for optimization of automatic gain control (AGC) loop for the IF amplification chain (including the LNA 2 and the IF amplifier 7) and a dynamic reduction in receiver power consumption if the input signal quality is more than sufficient to meet the requirements of the standard or some other requirement.

Scalability of number of bits and sampling frequency allows an additional trade-off to be made between receiver sensitivity and power consumption. Most multiplications in the algorithm are simple (shifts, negations). Only the first stages of digital processing of the sampled input signal, principally the double correlation, involve complex computations. Symmetries in processing, for example due to the repeated nature of the PN codes and the secondary demodulated signal components SI and SQ, can be exploited to further reduce hardware complexity.

With the low-IF transceiver described herein, using a simple receiver topology and a semi-coherent demodulator, it is estimated that the semi-coherent demodulator will deliver near theoretical limits of $SNR_{min}$. This represents an improvement in noise performance of around 5 dB over existing non-coherent architectures. Moreover, since the demodulator is in the digital circuit domain, this 5 dB of noise improvement comes for a very low circuit power penalty. The implications for the receiver topology of this semi-coherent demodulator are also favorable. The ADC resolution requirement will be limited to around 3 or 4 bits and the circuits in the receiver path can operate at a higher $n_f$, therefore further reducing circuit power consumption. Hence the receiver circuits can be designed from high gain active components with relatively relaxed noise requirements. The overall estimate is that the receiver described herein will achieve a sensitivity gain of 3 dB for the same power consumption of the current state of the art low-IF architectures.

Figure 6:
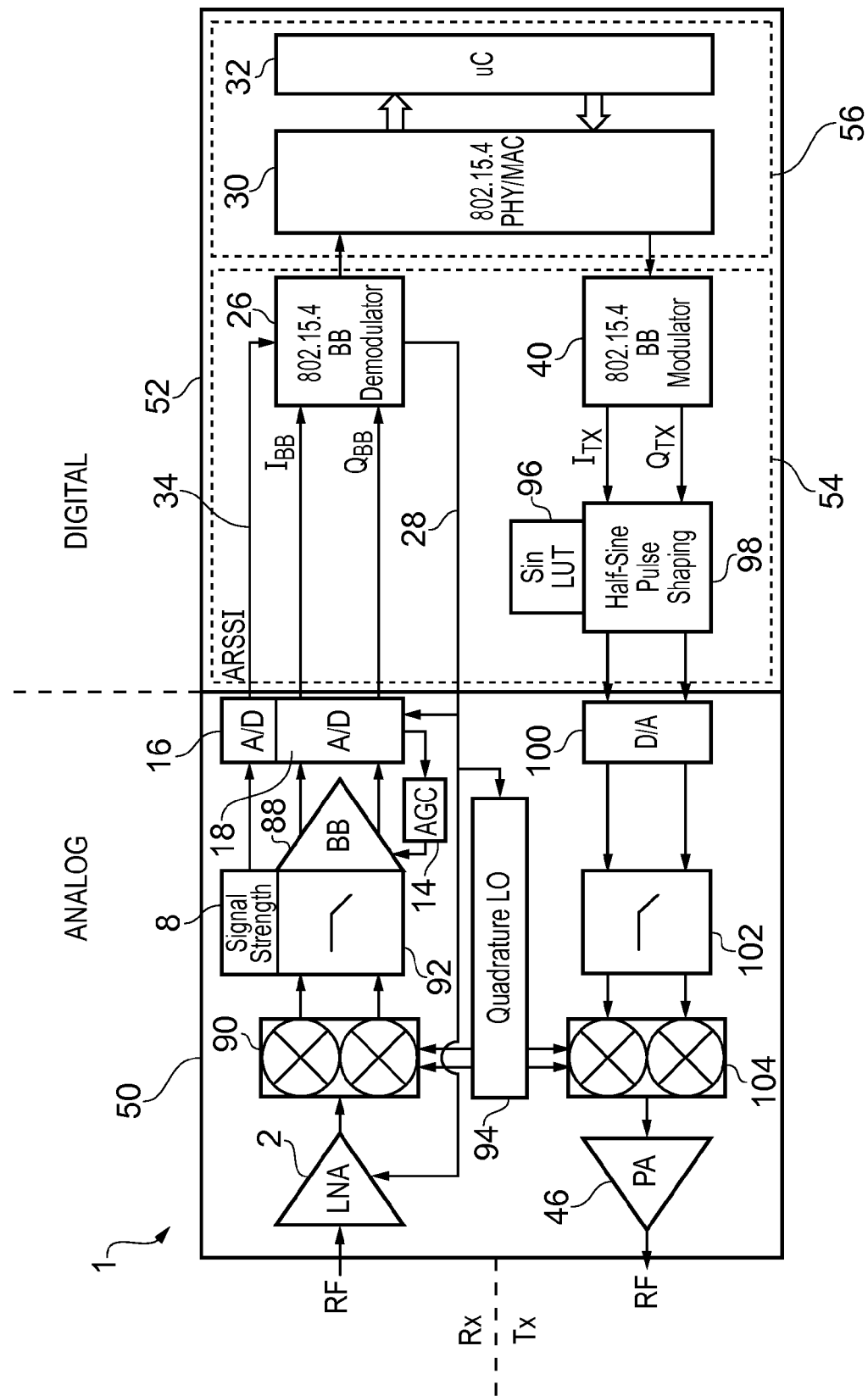
FIG. 6 shows an alternative transceiver according to a second embodiment of the invention.

FIG. 6 shows a transceiver 1 with an alternative system architecture according to a second embodiment of the invention.

The architecture of the second embodiment has many common features with that of the first embodiment and the overall structure will be apparent by comparing FIG. 6 with FIG. 1. The same reference numerals are used in FIG. 6 as in FIG. 1 for components which are the same, or have a correspondence in terms of their high level function.

The transceiver 1 has a functional split into two parts, namely a receiver Rx and a transmitter Tx, as well as a hardware split into two parts, namely an analog unit 50 and a digital unit 52. The analog unit 50 provides an RF front end for the transmitter and receiver. The digital unit 52 comprises a digital baseband processor 54 and a system control unit 56. Referring to FIG. 6, the receiver components 2, 90, 92, 88, 18 and 26 are arranged in the upper part of the drawing with the signal path from left to right, and the transmitter components 46, 104, 102, 100, 98 and 40 are arranged in the lower part of the drawing with the signal path from right to left. Both the receiver and transmitter components interact with the higher level control and processing components 30 and 32 visible in the right hand part of the drawing in the control unit 56. Again referring to FIG. 6, the analog RF front end 50 forms the left hand block of the drawing and the digital components in the digital unit 52 form the right hand block of the drawing. As will be appreciated the receiver signal is initially processed with analog components and subsequently processed with digital components, whereas the transmitter signal is initially formed digitally before being processed with analog components.

First the receiver is described.

The receiver Rx comprises a low noise amplifier 2 (LNA) at the input connected to an antenna (not shown). The LNA 2 is a high-gain amplifier with a target noise figure of ≤3 dB. The SNR and the sensitivity of the LNA 2 is controllable through the feedback control line 28. The external RF signal received by the LNA 2 is at a frequency of 2.405 GHz, as specified by the IEEE 802.15.4 standard. The output of the LNA 2 is electrically connected to a down conversion mixer 90 or a passive quadrature mixer. The down conversion mixer 90 multiplies the amplified signal with quadrature signals I and Q generated by a quadrature local oscillator (LO) 94. The quadrature signal Q is 90 degrees out of phase with the quadrature signal I. The quadrature LO 94 outputs a cosine-wave and a sine wave at the RF of 2.405 GHz.

The down conversion mixer 90 is connected to a low pass filter 92 and an BB amplifier 88. The low pass filter 92 is used to filter the unwanted RF component, leaving the baseband (BB) signal of each of the two signals from the down conversion mixer 90. The BB signal is at the chip frequency or chip rate i.e. 2 MHz. The signal strength of the BB signals that are fed into the low pass filter 92 from the BB amplifier 88 are detected by a signal strength detection unit 8. The $I_{IF}$ and $Q_{IF}$ signal components and the signal strength output are fed into respective analog to digital converters 18, 16 (ADC). The $I_{IF}$ and $Q_{IF}$ signal components are fed into a dual-input ADC 18 and the signal strength output signal from the signal strength unit 8 is fed into a separate ADC 16. The resolution and the sampling frequency of the dual-input ADC is controllable.

The dual-input ADC 18 and the BB amplifier 88 have an automatic gain control loop (AGC) comprising an AGC unit 14. The AGC unit is fed by the digital output from the dual-input ADC 18 to determine whether or not the gain of the BB amplifier 88 is high or low enough. If the signal is not high enough the gain of the BB amplifier 88 is increased and if the signal is too high the gain of the BB amplifier 88 is decreased. To determine whether or not the signal is too high too or too low, the digital output is analyzed. For example, if the bits from the most significant bits of the digital output signal have a consistently 'low' or 'zero' value, it is determined that the gain of the BB amplifier 88 should be increased. That is to say, if the fifth bit to the eight bit of an 8 bit ADC have a consistently 'low' or 'zero' value, it is determined that the gain of the BB amplifier 88 should be increased.

A connection 34 is made from the ADC 16 (for the signal strength detection unit 8) to a demodulator 26. The connection 34 between the ADC 16 and the demodulator 26 is referred to as the analog received signal strength indication (ARSSI).

The demodulator 26 is a semi-coherent baseband demodulator. The operation of the semi-coherent baseband demodulator is based on maximum detection of the correlator output, more particularly maximum likelihood (ML) time-delayed double correlation and continuous frequency correction during packet reception.

The demodulated output is in the form of the transmitted packet of bytes of data, as specified by the IEEE 802.15.4 standard, which is fed to an integrated 802.15.4 upper physical layer (PHY) and media access control (MAC) layer unit 30. This is connected to a multipurpose microcontroller 32. The microcontroller 32 may also be connected to at least one input device (e.g. temperature sensor) and/or at least one control device (e.g. heater).

The demodulator 26 is already described above with reference to FIGS. 2 to 5 for the first embodiment of the present invention. It will be appreciated that the operation of the demodulator shown in FIG. 6 is the same as that described for the demodulator 26 shown in FIG. 1.

The demodulator 26 also comprises a number of output connections 28, which are used to control the LNA 2, the LO 94, and the ADC 18.

The transmitter Tx side of the device is now described.

The transmitter comprises a modulator 40 that is connected to the 802.15.4 PHY/MAC unit 30. The 802.15.4 PHY/MAC unit 30 outputs a packet of data to be transmitted in the form of a number of bytes as specified by the IEEE 802.15.4 standard. The modulator 40 is a standard modulator, as is known in the art to produce both the in-phase and out-of-phase components $I_{Tx}$ and $Q_{Tx}$ of the symbols to be transmitted. That is to say the modulator converts the data to be transmitted into 32 chips, which are subsequently modulated into the in-phase and out-of-phase components $I_{Tx}$ and $Q_{Tx}$.

The modulated $I_{Tx}$ and $Q_{Tx}$ signals are then fed to a half-sine pulse shaping unit 98. The half-sine pulse shaping unit 98 converts the $I_{Tx}$ and $Q_{Tx}$ signal components into a digitized sine wave representation of the $I_{Tx}$ and $Q_{Tx}$ signal components using a sine LUT 96. The two digitized signals are then passed to a digital-to-analog converter (DAC) 100. The DAC 100 has a dual input and a dual output to receive and output both the in-phase and out-of-phase components of the signal to be transmitted. The two analog signals from the DAC 100 are fed to a low pass filter 102.

An up conversion mixer 104 is fed by the low pass filter 102. The up conversion mixer 104 multiplies the two analog components $I_{Tx}$ and $Q_{Tx}$ with a 2.405 GHz signal provided by the quadrature LO 94 and combines the in-phase and out-of-phase signal components, which are fed to a power amplifier 46. The output of the power amplifier 46 is connected to an antenna (not shown) for transmission.

Figure 7:
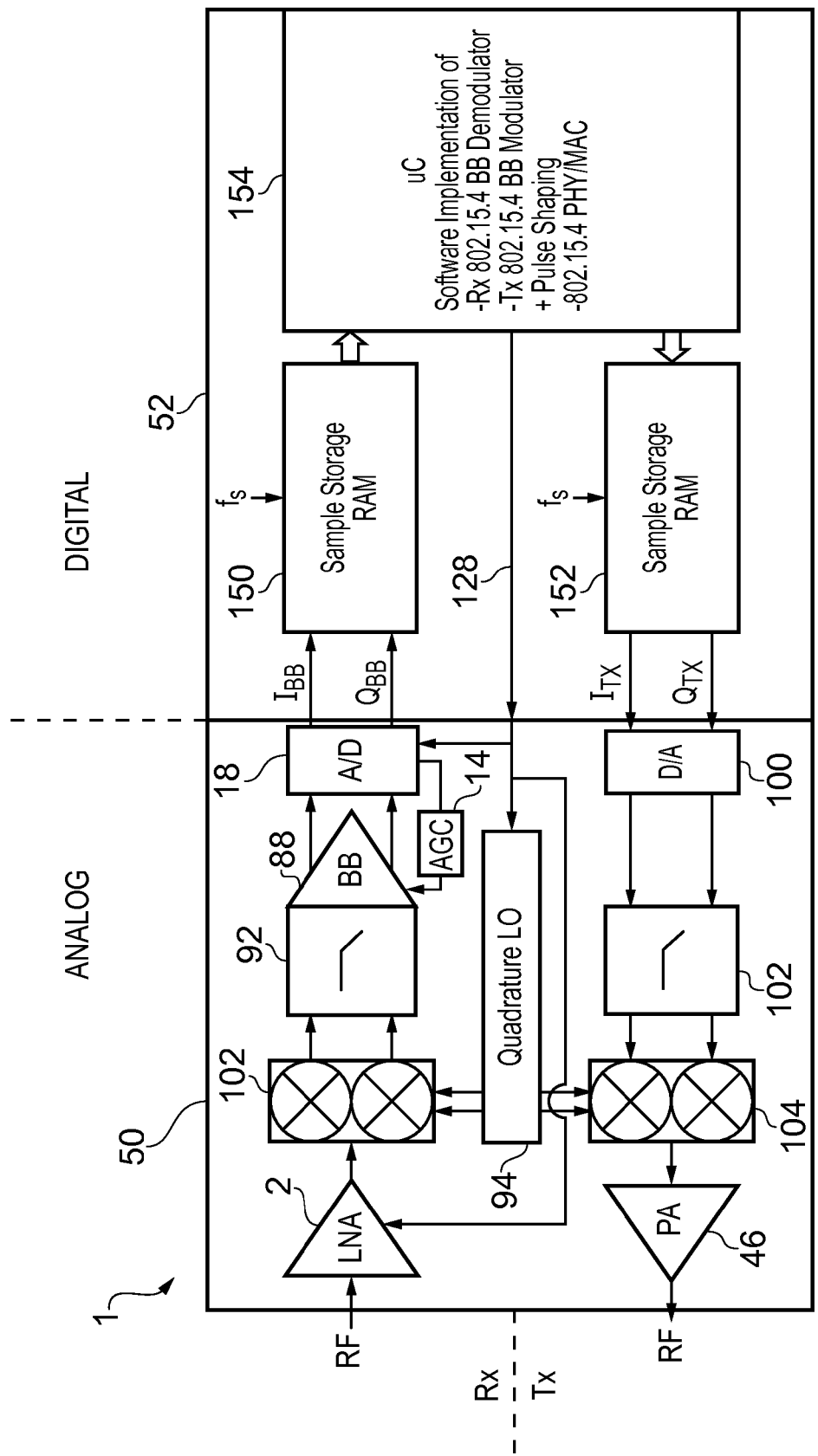
FIG. 7 shows an alternative transceiver according to a third embodiment of the invention.

FIG. 7 is an alternative system architecture to that shown in FIG. 6 showing a transceiver 1 according to a third embodiment of the invention. The third embodiment is best understood by comparison with the second embodiment. Reference numerals are re-used to the extent helpful for corresponding components. The design of the analog block 50 is the same in both embodiments, whereas a different approach has been used to design the digital block 52. Namely, the demodulation and modulation steps and the PHY/MAC layers are all implemented in a microcontroller 154. The microcontroller 154 implements the demodulator 26, the modulator 40, the half-sine pulse shaping unit 98 and the PHY/MAC 30. In addition, the digital block 52, further comprises a sample storage RAM unit 150 to sample the incoming digitized BB signal of the received signal components $I_{BB}$ and $Q_{BB}$ at the sampling frequency $f_s$ and a sample storage RAM unit 152 to sample the outgoing digitized baseband signal of the transmission signal components $I_{Tx}$ and $Q_{Tx}$ at the sampling frequency $f_s$. The sample storage RAMs 150, 152, will sample the incoming or outgoing signals in the same manner as the sampling unit 70 shown in FIG. 2. However, the sample storage RAMs 150, 152 will further comprise a memory in the form of a RAM to store the incoming or outgoing signals.

The incoming signal to the sample storage RAM 150 will be in the same form as the signal that is fed to the demodulator 26 shown in FIG. 6, namely the in-phase and out-of-phase baseband components of the received signal. The incoming is sampled at the sampling frequency $f_s$ at an oversampling ratio of 8 (NOS=8). However, it will be appreciated that low oversampling ratio might be used, e.g. 6, 4, or 2. The sampled signals are then stored in the Sample RAM 150, which has a data bus connecting to the microprocessor 154. The microprocessor 154 is then used to access the stored received signals.

The outgoing signal from the sample storage RAM 152 will be in the same form as the signal that is fed to the DAC 100 shown in FIG. 6, namely the in-phase and out-of-phase components of the transmission signal. The sample storage RAM 152 is connected to the microprocessor 154 via a data bus, such the microprocessor 154 can upload the transmission signal to the sample storage RAM 152. The outgoing signal is clocked from the sample storage RAM 152 at the sampling frequency $f_s$ at an oversampling rate of 8 (NOS=8). However, it will be appreciated that lower oversampling ratios might be used, e.g. 6, 4, or 2.

The analog block 50 of the transceiver 1 shown in FIG. 7, does not comprise a signal strength unit 8, a signal strength ADC 16 or an ARSSI connection 34. This is because the signal quality analysis is carried out on the digital signal in the microprocessor 154. The output connection 128 from the microprocessor 154 is used to control the LNA 2, LO 94 and the ADC 18, as described above. It will be appreciated that the analog block 50 of the transceiver 1 shown in FIG. 7, may comprise a signal strength unit 8, a signal strength ADC 16 or an ARSSI connection 34. It will be further appreciated that the signal quality analysis carried out in the first and second embodiments may be carried out on the digital signal and not the analog signal as described above.

Figure 8:
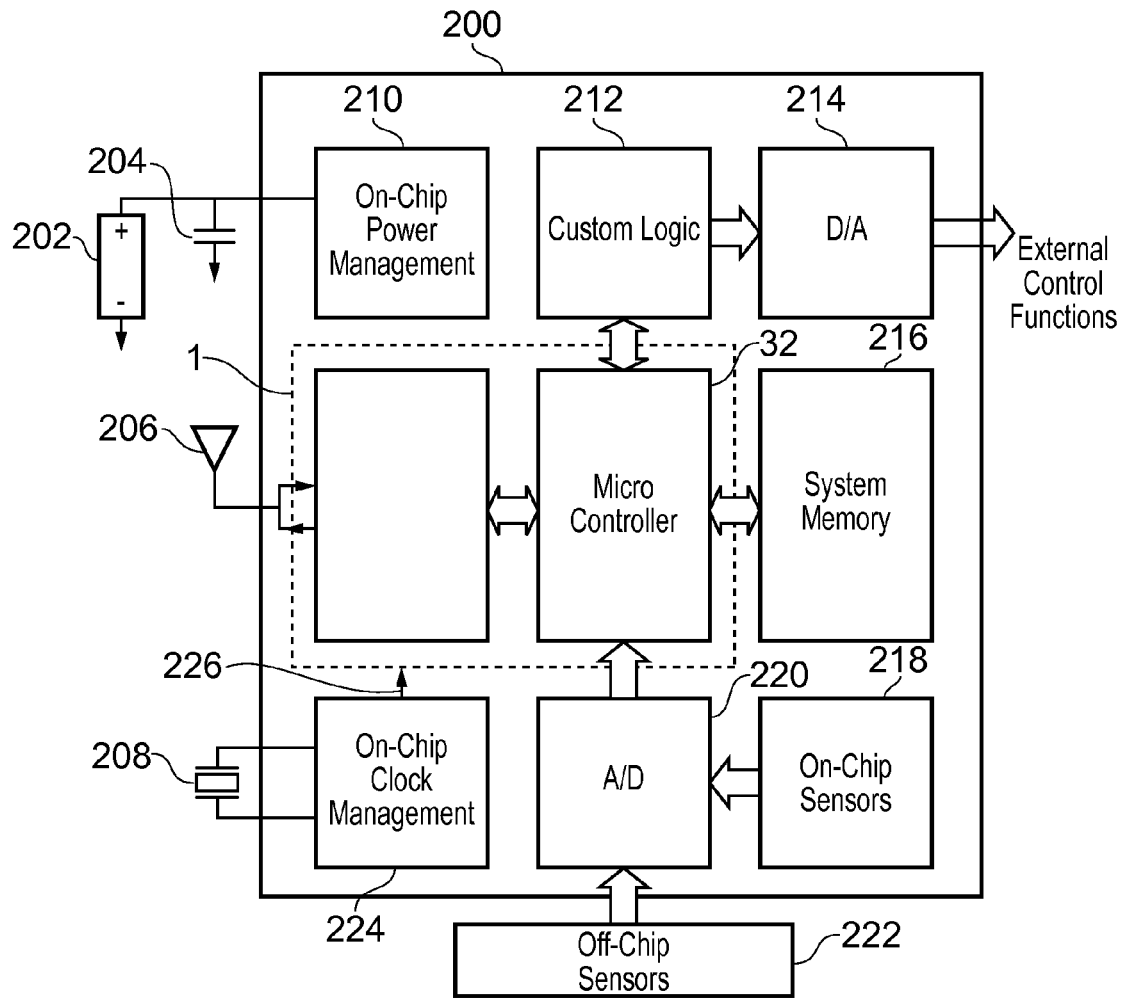
FIG. 8 shows a sub-assembly including a transceiver according to the first, second or third embodiments.

FIG. 8 shows an example integrated circuit (IC) 200 that comprises at least the transceiver 1 according to the first second or third embodiments of the present invention. The transceiver 1 is shown with a dotted line to indicate that the microcontroller or microprocessor 32 is also used as a central controller for the IC 200 and is not limited to only the transceiver 1. The microcontroller or microprocessor 32 is also provided with a system memory 216.

The IC is 200 is connected to the following external components; a power supply 202, a decoupling capacitor 204, an antenna 206 and a crystal oscillator 208. The power supply 202 is a battery or potable power source. However, the power supply 202 may also be a fixed or mains power supply depending on the application or location of the IC 200. FIG. 8 also shows an external sensor(s) 222. External sensors are optional and depend on the application and the type of sensor used. Examples of external sensors include, but are not limited to; optical sensors, humidity sensors, pressure sensors or acceleration sensors (i.e. accelerometers). Some of the sensors listed above may be implemented on the chip depending on the required accuracy of the application or fabrication process choice.

The IC 200 further comprises the following devices; an on-chip power management unit 210, a custom logic unit 212, a DAC 214, on-chip sensors 218, an ADC 220 and a on-clock management unit 224.

The on-chip clock management unit 224 provides the clock or timing signals to each of the components of the IC 200 at the frequency of 16 MHz, which coincides with the sampling frequency described above. Other than the blocks described above within the demodulator 26, the IC 200 operates at the same frequency of 16 MHz. The on-chip clock management unit 224 provides both the transceiver timing signals and the sampling timing signals to the transceiver 1, via connection 226. The on-chip clock management unit 224 is fed by a crystal 208.

The on-chip power management unit 210 provides the power to all the components of the IC 200. The precise connections are not shown in the figure for simplicity. The on-chip power management unit 210 may also be used to determine whether or not the chip is in a sleep mode (not transmitting or receiving) or an active mode (transmitting or receiving). Alternatively, the on-chip power management unit 210 may be controlled to put the IC 200 into a sleep or active mode.

The DAC 214 is used to control external functions (not shown), for example electromechanical, light or heating depending on the received signals. The DAC 214 is fed by a custom logic unit 212, which is used to produce the necessary control signals required by the external control functions. The custom logic unit is fed by the microprocessor 32.

The on-chip sensors 218 are sensors that can be fabricated on the same chip as the other components. Examples of on-chip sensors include optical sensors (silicon photo-diodes), temperature sensors or electromagnetic sensors. The ADC 220 is fed by the on-chip sensors 218 and the off-chip sensors 222. The digital output from the ADC 220 is then fed to the microcontroller 32 for control of the external functions or for transmission to another transceiver located else where.

Figure 9:
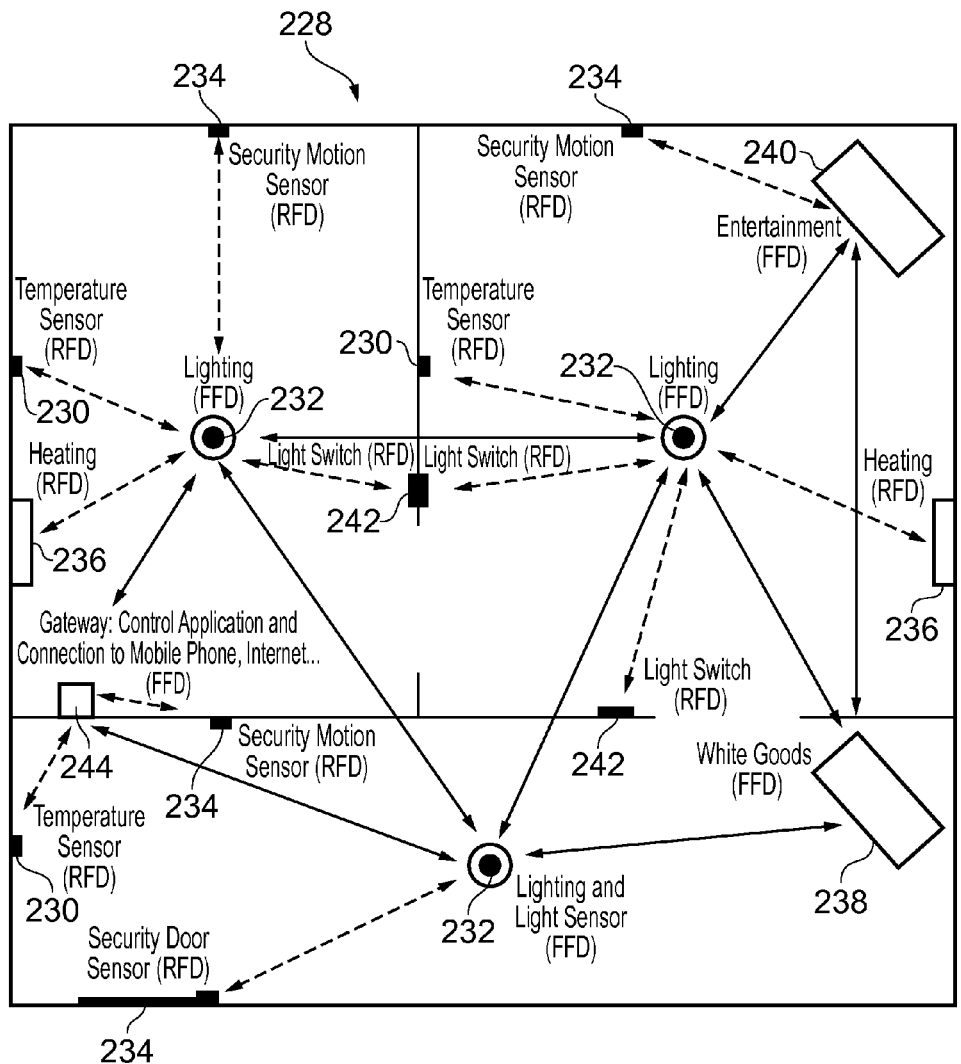
FIG. 9 shows an application example where the sub-assembly shown in FIG. 8 might be used.

FIG. 9 shows an application example 228. The example shown in FIG. 9, is a wireless Personal Area Network (WPAN), which is implemented for home automation. The home automation example shown in the figure integrates functions such as heating and lighting, security systems, and the control of white goods (e.g. refrigerators and entertainment consumer electronics). The application example 228 shown in the figure comprises a number of temperature sensors 230, lights (and light sensors) 232, security sensors 234, heaters 236, white goods 238, entertainment units 240, light switches 242 and a gateway 244. Each element in the network comprises an integrated circuit 200, as shown in FIG. 8. There are 2 types of network nodes: Fully Functional Devices (FFD) and Reduced Functionality Devices (RFD). The FFDs include lights 232, white goods 238, entertainment units 240 and the gateway 242. The RFDs include temperature sensors 230, security sensors 234, heaters 236, white goods 238, entertainment units 240 and light switches 242. Both the RFDs and the FFDs use the same hardware platform and standard (e.g. IC 200 shown in FIG. 8), but differ in the software stack running within the microcontroller 32, which implements the network structure. The FFDs form a mesh-type network (for example according to the ZigBee standard), in which each device can take over as network coordinator, and the network structure can be dynamically re-routed. The power consumption in FFD network nodes is not optimal, as the device has to be 'ON' (transmitting or receiving) for longer periods due to the routing and coordination overhead. By comparison, the RFD devices link into the network via a point-to-point connection to an FFD. As the RFDs are not network coordinators and have no routing tasks, the power consumption in RFD devices can be optimized by optimizing the 'OFF'-versus-'ON' time (duty cycle). Consequently, the RFDs can be powered by cheap batteries lasting for years. In the figure the mesh network connections between an FFD and an RFD are shown by dotted lines, and the point-to-point connections linking the RFDs are shown by solid lines. The gateway FFD 244, is used to run automation software for example for implementing energy saving and security policies, and can be used as a remote access point for the network via internet or mobile phone. Application examples also include offices and industrial plants.

Figure 10:
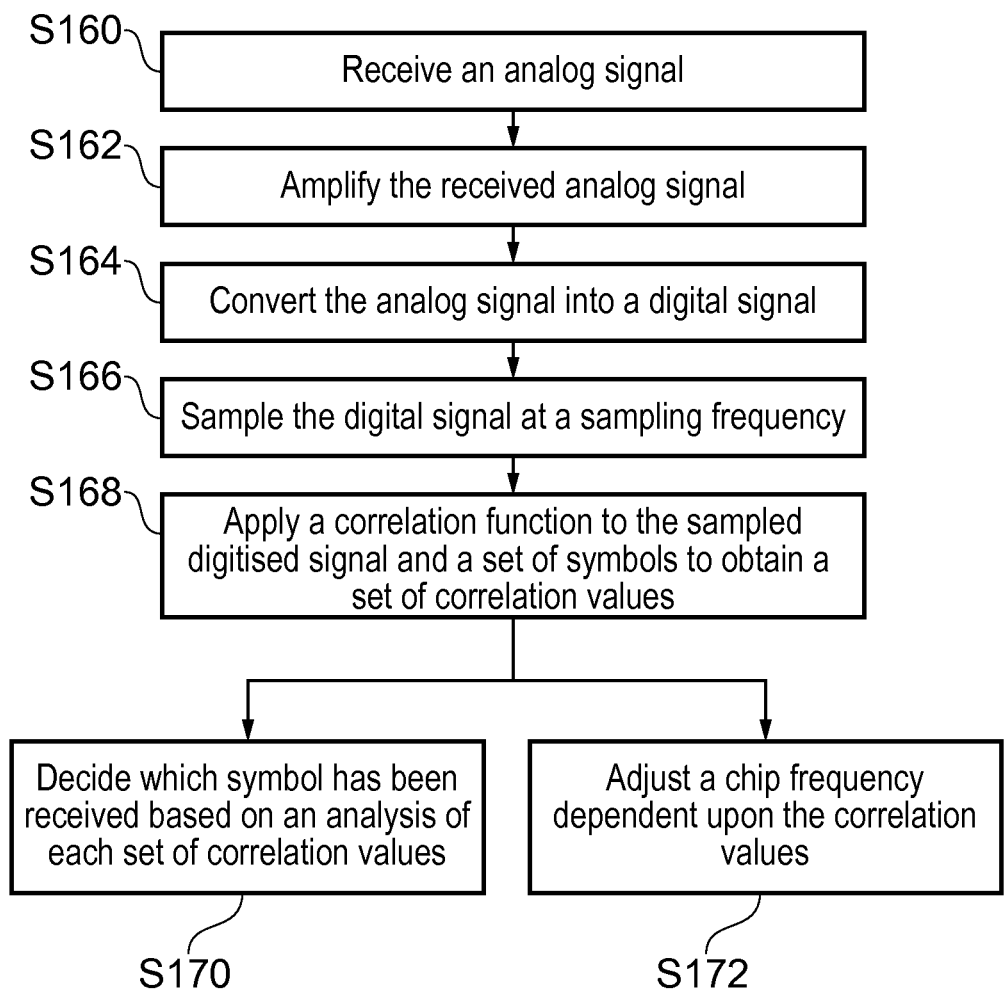
FIG. 10 shows a flow chart of a method according to the invention, as may be performed in a device according to any one of the first, second, or third embodiments.

FIG. 10 shows a flow chart of the steps carried out by any of the first, second and third embodiments of the present invention.

In step S160, an RF signal is received. The received signal is known to conform to a particular standard.

In step S162, the received analog signal is amplified. If the amplitude of the received signal is too low, it might be difficult to obtain the symbol information from the received signal. Furthermore, the amplification should not introduce noise to the received signal. A frequency down conversion may also be performed in this step.

In step S164 the analog signal is converted to a digital signal. The sample rate and/or sample resolution of the analog to digital conversion may be variable depending on the signal amplitude of the received signal.

In step S166, the digital signal is sampled at a sampling frequency. The sampling frequency has an oversampling ratio from 2 to 8, where the over sample ratio is defined as $f_s/f_{chip}$.

In step S168, a correlation function is applied to the sampled signal and a number of symbols that are predefined by the standard. The output of the correlation function is a set of correlation values that are an indicator of the likely mapping between the symbol that has been processed and a set of possible symbols defined according to the standard.

Following step S168, two operation steps are carried out on the output values from the correlator function.

In step S170, the correlator values are analyzed to determine which symbol was received. This may be done by be comparing each of the values from the correlator function.

In step S172, adjustments are made to a chip frequency dependent upon the correlation values.

The demodulation technique described above for embodiments of the invention are for the IEEE 802.15.4 standard. However, it will be appreciated that the same demodulation technique may be applied to the following:

high-end cordless phones operating in industrial, scientific and medical (ISM) bands (2.4 GHz and 5.8 GHz);
remote control R/C links (i.e. for models);
802.11b Wifi. 1st generation WiFi.

In summary of the detailed description, a wireless receiver is provided which conforms to IEEE 802.15.4. A wireless receiver designed to conform to the standard IEEE 802.15.4. The receiver comprises an analog front-end and a digital decoder. The analog components of the front end include one or more amplifiers and an analog-to-digital converter (ADC). The digital decoder receives the output of the ADC and demodulates it in a demodulator which is driven at an a chip frequency by an internal or external clock. The demodulator comprises a sampler operable to sample the digital signal at a sampling frequency and a correlation unit operable to process a set of bits, referred to as a chip code, in the sampled digitized signal and output therefrom a set of correlation values. The set of correlation values is an indicator of likely mapping between the chip code that has been processed and a set of possible chip codes defined according to the standard. The demodulator further comprises a symbol selection unit and a frequency correction unit. The symbol selection unit has the function of deciding which symbol has been received based on an analysis of each set of correlation values. The frequency correction unit is operable to make adjustments to the chip frequency based on the correlation values output from the correlation unit, specifically to increase or decrease the chip frequency based on a measurement of whether the maximum correlation value among each set of correlation values occurs earlier or later than predicted. This scheme has the advantage that phase and frequency compensation is done after correlation avoiding the need for coherent demodulation while at the same time not requiring the stringent specifications of a conventional non-coherent demodulation scheme.

REFERENCES

1. "CMOS RFIC Architectures for IEEE802.15.4 Networks", John Notor, Anthony Caviglia, and Gary Levy, Cadence Design Systems Inc. IEEE, 2003.
2. "Designing a ZigBee-ready IEEE 802.15.4-compliant radio transceiver", Khanh Tuan Le, Chipcon, RF Design, November 2004.
3. "An Ultra Low Power 130 nm CMOS Direct Conversion Transceiver for IEEE802.15.4", C. Bernier, F. Hameau, G. Billiot, E. de Foucauld, S. Robinet, J. Durupti, F. Dehmas, E. Mercier, P. Vincent, L. Ouvry, D. Lattard, M. Gary, C. Bour, J. Prouvee, and S. Dumas, IEEE 2008 Radio Frequency Integrated Circuit (RFIC) Symposium, 15-17 Jun. 2008.
4. "Evaluation of SDR-implementation of IEEE 802.15.4 Physical Layer", Roger Martinsen Koteng, Master of Science in Electronics-Thesis, July 2006.
5. "A Low-Complexity Frequency Offset Insensitive Detection for 2.4 GHz LR-WPAN", Jung-Su Han and Hyung-Jin Choi, IEICE Transactions on Communications, volume E91-B, Number 7, July 2008.

What is claimed is:

1. A receiver operable according to a standard to decode digital data from an analog signal, comprising an analog front-end and a digital decoder, wherein the analog front-end comprises a plurality of analog components including an analog signal input for receiving the analog signal, at least one amplifier arranged to amplify the analog signal, and an analog-to digital converter (ADC) arranged to convert the amplified analog signal into a digital signal, and wherein the digital decoder comprises a digital signal input connected to the output of the ADC and a demodulator comprising a plurality of digital components connected to be driven by a clock signal having a chip frequency, the digital components including:

a sampler operable to sample the digital signal at a sampling frequency which is a multiple of the chip frequency;

a correlation unit operable to process a set of bits, referred to as a symbol, in the sampled digitized signal using a double correlation function and output therefrom a set of correlation values, wherein the set of correlation values is an indicator of likely mapping between the symbol that has been processed and a set of possible symbols defined according to the standard;

a symbol selection unit having the function of deciding which symbol has been received based on an analysis of each set of correlation values; and a frequency correction unit operable to output a frequency control signal for momentary adjustment of the chip frequency dependent upon the correlation values output from the correlation unit.

2. The receiver of claim 1, wherein the frequency correction unit is operable to increase or decrease the chip frequency for an amount of time based on a measurement of whether the maximum correlation value among each set of correlation values occurs earlier or later than predicted according to the chip frequency currently in use.

3. The receiver of claim 2, further comprising a synchronization unit having an input connected to receive the frequency control signal from the frequency correction unit, and an output operable to output a clock signal at the chip frequency to the components of the demodulator, wherein the synchronization unit sets the chip frequency having regard to the frequency control signal.

4. The receiver of claim 1, wherein the digital decoder further comprises:

an averaging unit interposed between the correlation unit and the symbol selection unit, the averaging unit being operable to modify the correlation values output by the correlation unit by averaging each correlation value over a succession of time intervals spanning a timing window centered around a predicted correct detection time.

5. The receiver of claim 1, further comprising a signal quality analysis unit comprising:

an input connected to receive an analog received signal strength indicator (ARSSI) signal indicative of signal strength of the analog signal after its amplification;

a processing part operable to assess on an ongoing basis how a measured performance attribute at the demodulator compares with a minimum value of that performance attribute required to satisfy the standard, thereby to determine an operating margin; and a control output connected to a control input of at least one component in the analog front end and operable to output a front-end control signal based on the operating margin and the ARSSI signal.

6. The receiver of claim 5, wherein the performance attribute is, or is derived from, one or more of baseband signal-to-noise ratio, and noise factor.

7. The receiver of claim 5, wherein the at least one amplifier has a gain which is controlled in use according to the front-end control signal.

8. The receiver of claim 5, wherein the ADC has a bit resolution which is variable and controlled in use according to the front-end control signal.

9. The receiver of claim 5, wherein the ADC is operated with an ADC sampling frequency which is controlled in use according to the front-end control signal.

10. The receiver of claim 1, further comprising an antenna connected to the analog signal input for receiving the analog signal wirelessly.

11. A transceiver comprising a receiver according to claim 1 and a transmitter having a digital part, including a modulator, integrated with the receiver's digital decoder, and an analog part integrated with the receiver's analog front end.

12. A wireless personal area network comprising a plurality of transceivers according to claim 11 each arranged in operative wireless communication with at least one other of the transceivers.

13. A method of decoding digital data from an analog signal known to conform to a particular standard, the method comprising:

(i) receiving the analog signal;
(ii) amplifying the analog signal;
(iii) converting the analog signal into a digital signal; and
(iv) demodulating the digital signal at a chip frequency set by a clock signal, wherein the demodulating is carried out by:
 (a) sampling the digital signal at a sampling frequency which is a multiple of the chip frequency;
 (b) applying a double correlation function to process a set of bits, referred to as a symbol, in the sampled digitized signal to compute a set of correlation values, wherein the set of correlation values is an indicator of likely mapping between the symbol that has been processed and a set of possible symbols defined according to the standard; and
 (c) deciding which symbol has been received based on an analysis of each set of correlation values, wherein the chip frequency is adjusted momentarily dependent upon the correlation values.

14. The method of claim 13, wherein the chip frequency is increased or decreased for an amount of time based on a measurement of whether the maximum correlation value among each set of correlation values occurs earlier or later than predicted according to the chip frequency currently in use.

* * * * *